(12) United States Patent
Kay et al.

(10) Patent No.: US 6,882,985 B1
(45) Date of Patent: Apr. 19, 2005

(54) MARKETPLACE SYSTEM FEES ENHANCING MARKET SHARE AND PARTICIPATION

(76) Inventors: Alan F. Kay, 10 Carrera St., St. Augustine, FL (US) 32084; Hazel Henderson, P.O. Box 5190, St. Augustine, FL (US) 32085-5190; Charles Pyne, 187 Seekonk St., Norfolk, MA (US) 02056

(*) Notice: Subject to any disclaimer, the term of this patent is extended or adjusted under 35 U.S.C. 154(b) by 0 days.

(21) Appl. No.: 09/913,674
(22) PCT Filed: Apr. 7, 2000
(86) PCT No.: PCT/US00/09198
§ 371 (c)(1),
(2), (4) Date: Aug. 16, 2001
(87) PCT Pub. No.: WO00/62225
PCT Pub. Date: Oct. 19, 2000

Related U.S. Application Data
(60) Provisional application No. 60/174,363, filed on Jan. 4, 2000, provisional application No. 60/131,054, filed on Apr. 26, 1999, and provisional application No. 60/128,263, filed on Apr. 8, 1999.

(51) Int. Cl.⁷ .............................................. G06F 17/60
(52) U.S. Cl. .............................. 705/37; 705/1; 705/400
(58) Field of Search .......................... 705/1, 7, 11, 37, 705/400

(56) References Cited

U.S. PATENT DOCUMENTS

| | | |
|---|---|---|
| 3,573,747 A | 4/1971 | Adams et al. |
| 3,764,063 A | 10/1973 | Siegel |
| 5,077,665 A | 12/1991 | Silverman et al. |
| 5,101,353 A | 3/1992 | Lupien et al. |
| 6,041,308 A * | 3/2000 | Walker et al. ............ 705/14 |
| 6,134,533 A * | 10/2000 | Shell .................... 705/26 |

FOREIGN PATENT DOCUMENTS

WO    WO 00/26834    5/2000

OTHER PUBLICATIONS

Sorkin et al: Follow the money (trading tips), Apr. 1995, Futures (Cedar Falls, Iowa), v24, n4, pp. 42–43, see entire document.
Enerchange Signs Letter of Intent to Start Electronic Trading System; Aug. 11, 1995, Inside FERCs Gas Market Report, p. 2.

* cited by examiner

Primary Examiner—Edward R. Cosimano
(74) Attorney, Agent, or Firm—Oppedahl & Larson LLP

(57) ABSTRACT

A method for use by buyers and sellers in the execution of trades. The price of each executed trade within the system is logged. Next, a trend line is derived from the logged trades. The trading fee for a particular trade is determined based on the difference between the trade's price and the trend line as well as the size of the trade. This fee is imposed upon the buyer if the price of the trade is below the trend line, or imposed upon the seller if the price of the trade is above the trend line. The market markers in each item are evaluated according to how narrow their spreads were at the time of each transaction, and receive periodic bonuses based on these evaluations. A "crisis fee" is imposed on trades in the system when particularly measured qualities exceed normal bounds.

27 Claims, 13 Drawing Sheets

MESSAGE SWITCHING/DISTRIBUTION (NON-NODE COMPUTERS)

INDUSTRY USERS

- Ⓞ ORGANIZATION OR SERVICER
- C CUSTOMER
- S SUPPLIER

MARKETPLACE SYSTEM FEES ENHANCING MARKET SHARE AND PARTICIPATION

To the extent permitted by law, this application claims priority from and incorporates by reference from U.S. application Nos. 60/128,263 (filed Apr. 8, 1999), 60/131,054 (filed Apr. 26, 1999), and 60/174,363 (filed Jan. 4, 2000).

BACKGROUND

In recent years electronic transaction systems that are the functional equivalent of some or all of the roles of the traditional marketplace have become commercially important. Building upon and expanding the automation of the voice-only telephone network, such systems are called marketplace systems. Marketplace systems, to varying degrees and in different ways, automate markets. Examples are to be found in the thousands of e-commerce web sites of the Internet, in many commodity and stock exchanges around the world, in the block trading of stocks by financial institutions, in financial markets of all kinds (the largest of which is the global foreign exchange market), in wholesale produce markets, in cattle markets, in lumber markets (mills and wholesalers), in jewelry trading, markets for event tickets, airline reservations, book buying and numerous others. Other examples include systems sponsored by organizations or corporations that electronically link many of their own business activities to their suppliers, to their customers, or to both, and may be shared among several organizations in an industry.

In the generic description covering such diverse markets, it is useful to use the term item to cover anything that is sought and/or provided in a market, including products, services, and information. Some markets cover only a single item but a more typical market carries hundreds, thousands, even potentially an unlimited number of different items. Furthermore although purchase and sale is the main function of many markets, many others are limited simply to supplying information on availability of items, or to facilitate some part of the purchase and sale process. Although all of these markets may have some degree of automation, many are not fully automated, particularly the actual execution of a transaction often requires some human interaction beyond pressing a button that consummates the transaction, such as a voice conversation. Furthermore, it is not just purchase and sale that may be the functional activity or activities of the system, but other functions such as renting and leasing, shipping and insuring, delivering and receiving, tracking and reporting, borrowing and lending; losing, finding and returning, and similar transactions may be functions of a market. We also use the term user of a marketplace system to cover any person or organization that participates in any of these activities. Two (occasionally more) users are involved as parties to each transaction. Each is a counterparty to the other(s). In some markets users are restricted to members, to professionals in the activity of the market, or to other categories. In some cases almost anyone may be a user. In traditional markets users were local. In today's marketplace systems, users can be anyplace in the world.

Markets and marketplace systems alike are owned and controlled by one or more individuals, sponsors, organizations, agencies, governments, or associations, called here the sponsors. Sponsors, acting themselves or through agents, assignees, or employees, here called managers, have responsibility for managing, upgrading, revising and operating the market. Various agreements between sponsors and between sponsors and managers in a marketplace system assign responsibility for operating and management functions, as well as provide for payments for services, for maintaining, upgrading, or modifying the system and operating it on an ongoing basis.

This invention pertains to marketplaces which have rapid transaction rates in individual items, particularly financial markets, but also in some commercial and industrial markets. These markets often have traders or brokers handling transaction negotiations for their organizations or their clients. Financial markets also usually have dealers and market makers. With the advent of e-commerce many markets are beginning to be totally automated. Customers and principals initiate and execute transactions through the Internet or intranets with no human intermediaries. This development is putting pressure on the financial markets where dealers and market makers have played a central role. Even if the roles of dealers and market makers become marginal, the dominant principals in many financial markets with a need to transact at rapid rates require in-house traders to handle their transaction volumes. They may also use brokers, whose services less active participants in these markets require. To cover all of these cases, marketplaces which have rapid transaction rates in individual items can be distinguished by the presence and role of traders.

Market makers are dealers who usually are prepared to both buy and sell each item they make a market in, in a range of sizes, and throughout the trading day. When a customer asks for a quote on an item (without revealing its own interests in the item) a good market maker in many markets gives a complete quote in size, including up to four numbers: a bid price (and the size it is good for) and an ask price (and the size it is good for). The size is often implicit and the same for both sides. The difference between the bid and the ask, the spread, represents the gross profit per unit item that the dealer receives on a purchase and a sale, assuming the quotes for both were the same. Other things being equal, the dealer willing to furnish a valid quote with a smaller spread and over a greater range of volumes, more reliably (with fewer exceptions because of difficult market conditions or for whatever reason) is a dealer who is providing a better, more efficient, and lower cost service than some other dealer whose quote has one or more of three features(a) a larger spread, (b) for a smaller range of sizes, and (c) is available over a smaller portion of the trading day. The first dealer not only offers a better service than the second dealer but also helps the sponsors produce a more efficient marketplace system. The payment methods of the invention should and can be made to favor more efficient dealers. Not all persons or organizations seeking to buy or sell an item in a marketplace use a dealer. Many dealers' customers are large financial institutions or financial branches of conglomerates which themselves also act as dealers and market makers with their own sets of customers.

It is desired to provide a system in which fees are assessed in a way which promotes stability and minimizes interference in the system. It is also desired to provide a system in which the imposition of fees is performed in a way which is as "painless" as possible. It is further desired to provide a system which evaluates the performance of market makers in an objective way. Finally, it is desired to provide a way to slow down and avert a "run" on a currency.

Older trading systems are described, for example, in the following US patents: U.S. Pat. No. 6,035,289 Method and apparatus for electronic trading of carrier cargo capacity; U.S. Pat. No. 6,016,483 Method and apparatus for automated opening of options exchange; U.S. Pat. No. 6,014,643

Interactive securities trading system; U.S. Pat. No. 6,014, 627 Credit management for electronic brokerage system; U.S. Pat. No. 6,012,046 Crossing network utilizing satisfaction density profile with price discovery features; U.S. Pat. No. 5,995,947 Interactive mortgage and loan information and real-time trading system; U.S. Pat. No. 5,950,176 Computer-implemented securities trading system with a virtual specialist function; U.S. Pat. No. 5,926,801 Electronic security/stock trading system with voice synthesis response for indication of transaction status; U.S. Pat. No. 5,924,083 Distributed matching system for displaying a book of credit filtered bids and offers; U.S. Pat. No. 5,915, 209 Bond trading system; U.S. Pat. No. 5,873,071 Computer method and system for intermediated exchange of commodities; U.S. Pat. No. 5,845,266 Crossing network utilizing satisfaction density profile with price discovery features; U.S. Pat. No. 5,689,652 Crossing network utilizing optimal mutual satisfaction density profile; U.S. Pat. No. 5,630,127 Program storage device and computer program product for managing an event driven management information system with rule-based application structure stored in a relational database; U.S. Pat. No. 5,454,104 Financial data event flow analysis system with study conductor display; U.S. Pat. No. 5,375,055 Credit management for electronic brokerage system; U.S. Pat. No. 5,347,452 Method for providing a visual display of current trading volume and cumulative average trading volume for preselected time intervals; U.S. Pat. No. 5,305,200 Financial exchange system having automated recovery/rollback of unacknowledged orders; U.S. Pat. No. 5,297,032 Securities trading workstation; U.S. Pat. No. 5,285,383 Method for carrying out transactions of goods using electronic title; U.S. Pat. No. 5,195,031 Trading system for providing real time context sensitive trading messages based on conversation analysis; U.S. Pat. No. 5,185,696 Financial calculator capable of displaying graphic representation; U.S. Pat. No. 5,063,507 Goods database employing electronic title or documentary-type title; U.S. Pat. No. 4,903,201 Automated futures trading exchange; U.S. Pat. No. 4,674,044 Automated securities trading system; U.S. Pat. No. 4,292,508 Trading system; as well as U.S. Pat. Nos. 5,313,560, and 5,974,485.

Older trading systems are also described in the following PCT publications: WO 00/16224 Communication of credit filtered prices in an electronic brokerage system; WO 00/11588 Anti-manipulation method and system for a real-time computerized stock trading system; WO 00/11587 A real-time computerized stock trading system; WO 99/26173 A configurable electronic trading system and the method therefor; WO 99/19821 Systems, methods and computer program products for electronic trading of financial instruments; WO 99/10815 Exchange method and apparatus; WO 98/49639 Network computer trading system; WO 98/21667 System and method for trading having a principal market maker; WO 97/45802 Distributed matching system for displaying a book of credit filtered bids and offers; WO 97/30407 Universal contract exchange; WO 97/22072 Electronic trading system including an auto-arbitrage feature or name switching feature; WO 97/08640 Anonymous trading system within improved quote input capabilities; as well as WO 97/19427.

Principal references in this area are Henderson, H, Kay, A. F., Introducing Competition to Global Currency Markets, Futures 28(4):305–24 and Kay, A. F., Henderson, H, Futures 31 (1999) 759–777. Other references are Australian Financial Review, Henderson's the Breaking Point, p. 1–9, Dec. 4, 1998; BBC Online Network, London, UK Oct. 30, 1998; US Treasury Press release, Declaration of G-7 Finance Ministers and Central Bank Governors, Oct. 30, 1998; Greenspan, A., The Structure of the International Financial System. Annual meeting of the Securities Industry, Boca Raton, Fla., Nov. 5, 1998; The Economist, Jan. 23, 1999, p. 69, Argentina; Building, a Win Win World, Berrett Koehler, San Francisco (1996, 1997); The Economist, When countries go bust, Oct. 3; 1998, p. 88; Business Week, Jan. 25, 1999, p. 126; Henderson, H, Building a Win Win World, Ch. 9. Information; The World's new Currency Isn't Scarce, Berrett Koehler, San Francisco (1996, 1997); UI Haq M, Kaul I. Grunberg I, editors, The Tobin Tax; Coping with Financial Volatility, London; Oxford University Press, 1996; Soete L, Weel B. Cybertax, Futures 1999:309; 853–71; The Economist, Global Capitalism; Making it Work; Invited essay by Jeffrey Sachs, Sep. 12, 1998 23–5; Business Week, Feb. 8, 1999, pp. 64–77; The Economist, Global Finance section, Jan. 30, 1999; Challenge to the South, South Commission, Oxford University Press (1990); Soros, C, The crisis of global capitalism, New York, Public Affairs, 1998; The Economist, Oct. 10, 1998, p. 18; Eichengreen B, Toward a New International Financial Architecture, Institute for International Economics, Washington, D.C., 1999.

SUMMARY OF INVENTION

What is disclosed is a method for use by buyers and sellers in the execution of trades, each trade defining a respective price. In this method, prices of trades executed within the system are logged and a trend line is derived therefrom. A trading fee for a particular trade is determined, the fee imposed upon the buyer in the event the respective price is below the trend line, the fee imposed upon the seller in the event the respective price is above the trend line. The amount of the fee is functionally related to the difference between the respective price and the trend line. Preferably the fee is in a monotonic increasing relationship with the magnitude of the difference, and is in a monotonically increasing relationship with the size of the particular trade, but the latter may be very slowly increasing (e.g. logarithmically). (The relationship might be generally increasing or might be substantially monotonic.) In systems where there are market makers, the market makers in each item are evaluated according to how narrow their spreads were at the time of each transaction. Authorized market makes, under agreement with sponsors, receive periodic bonuses based on these evaluations in comparison with all others authorized to make markets in the same item and in the same size range during the period. A "crisis fee" is imposed oil trades in the system when particularly measured qualities exceed normal bounds. The system may be established it the foreign exchange market for the central bank in a first country and extended to central banks of other countries.

DESCRIPTION OF THE DRAWING

FIG. 12 shows schematically the trading system encompassed by claims 1 through 9 and 10 through 18.

FIG. 13 shows schematically the market maker evaluation system encompassed by claims 19 through 21.

FIG. 14 shows schematically the currency system encompassed by claim 22.

FIG. 15 shows schematically the country currency-trading system encompassed by claims 23 through 25.

FIG. 16 shows schematically the market maker ranking system encompassed by claims 26 and 27.

DETAILED DESCRIPTION

Figure 3:
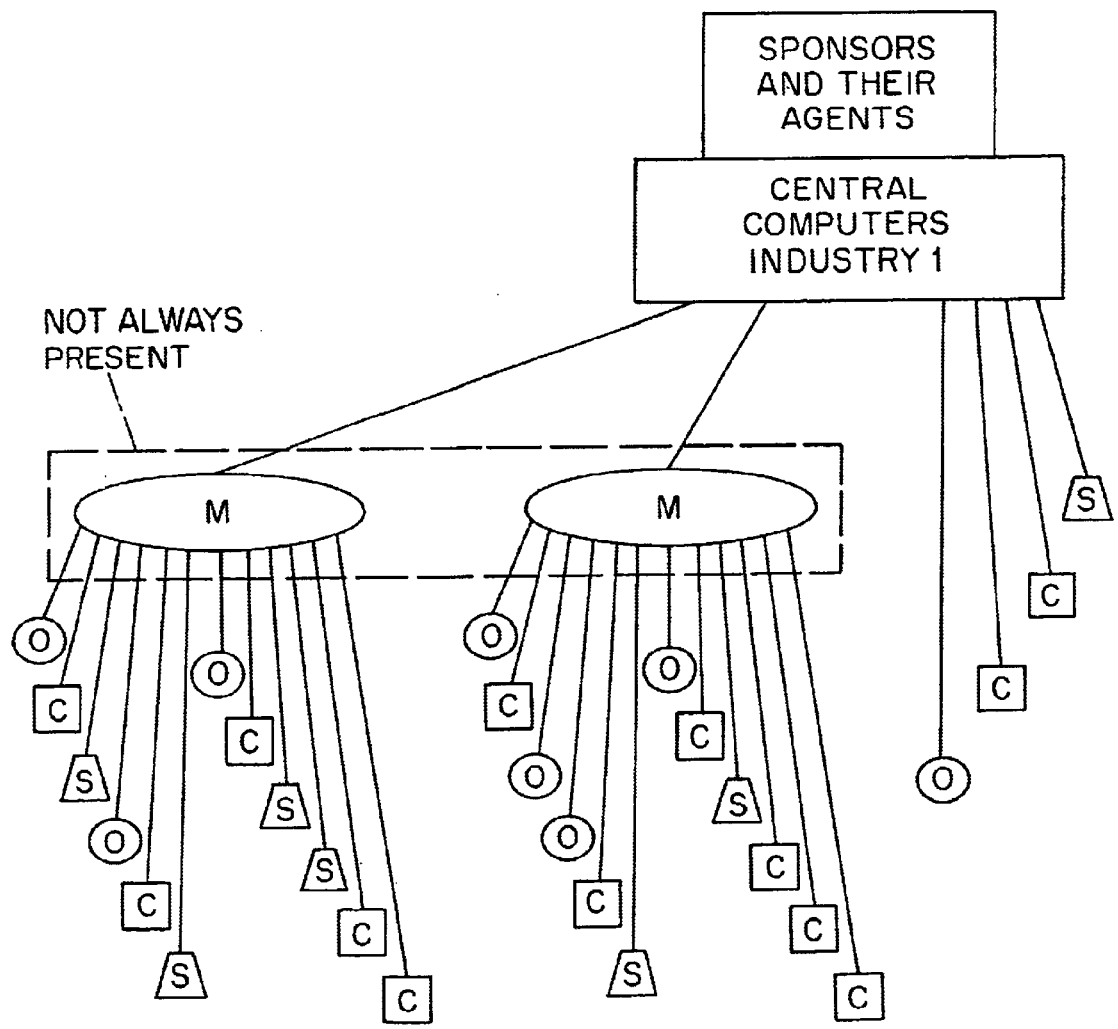
FIG. 3 shows the organization of suppliers, customers and other participants in a trading system.
Figure 3:
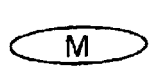

A trading system (FIG. 3) serves as the marketplace for one or more organizations in a generally competitive industry that, by the use of output from suppliers and other industry-need-servicers, produces for industry customers products, services and/or data (or other marketable information) and generates orders to suppliers, which system is owned or controlled by a sponsor or sponsors and links system users (industry organizations, suppliers, and/or customers) with each other in a communication network for the purpose of executing or assisting in the advertising of needs and interests, and/or the consummation, notification, settlement, and distribution of transaction-related information/data between users, which users may also include organizations which service all or many producers in the industry, organizations such as providers of specialized trade newsletters, journals, magazines, conventions, insurance, and shipping, and may also include industry trade associations that set standards, codes of conduct, dispute resolution procedures, and generally have oversight of the industry or portions of it, and government agencies, which may regulate the industry, which system consists of one or more central computers linked to terminals located in user offices or premises via the communication network consisting of various transmission means, such as satellite, telephone, cable, radio, and optical, for the distribution of the information carried by the system to and from users, which information is often called data when processed or stored in the central computers and messages when carried on the network and which distribution is sometimes augmented by other computers (controllers, multiplexers, servers, etc.) which are included in the network to increase the allowed number of users, and/or the speed and capacity of message distribution of the data, and which central computers and terminals are considered as nodes of the network, which terminals can be personal computers (pc's), other computers, and/or telephones and can include TV monitors, keyboards, printers, and other data storage, input, and retrieval devices, which transactions are generally thought of as buying and selling but can include, but are not limited to, brokering, renting, borrowing, bartering, financing, lending, shipping, insuring, credit-checking and extending, appraising, grading, tracking and verifying, losing/finding and returning, receiving and accepting selected (or all) of the individual items produced by the industry, which items include products, services or data, which system also permits users to see the quotations of others essentially instantaneously, including the best bids and offers available in all items traded by the system and an instantaneous "ticker" of latest transaction prices in all items, which system also may acknowledge, confirm, reconcile, settle, process, store and retrieve ancillary materials associated with transactions such as confirmations, invoices, bills, payments, and various analyses and summaries of data generated by transactions over various time periods, which analyses and summaries may be of interest either to a single user, many users, the media, and/or the general public, which users transact (buy/sell/etc.) fungible (or pseudo-fungible) items at high speed and usually employ or have as agents traders or others to enter into the system orders, indications, or similar messages that initiate, negotiate, execute, and/or consummate transactions, while allowing for instances where executions in part take place by telephone communications between users or by other means not part of the system, where pseudo-fungible items are items which need a large number of parameters or specifications to make it possible for both sides to agree on a transaction, but all of which parameters and specifications may be referenced by a relatively short label, reference numbers, icons, or other description of the item or by conformance to an industry-accepted standard so referenced with the result that, one way or another, a quick and satisfactory transaction may be consummated.

Figure 12:
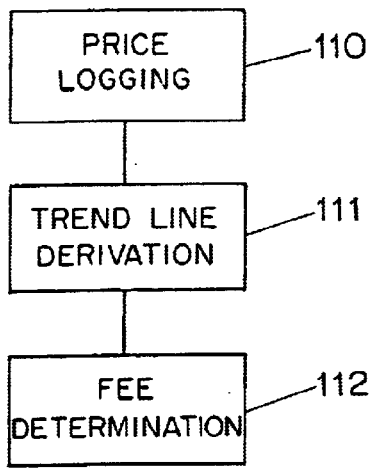
FIG. 12 is a functional block diagram for a system according to the invention.

FIG. 12 is a functional block diagram for a system according to the invention. The system includes apparatus 110 logging prices of trades executed within the system; apparatus 111 deriving a trend line from said logged prices; and apparatus 112 determining a trading fee for a particular trade.

Figure 13:
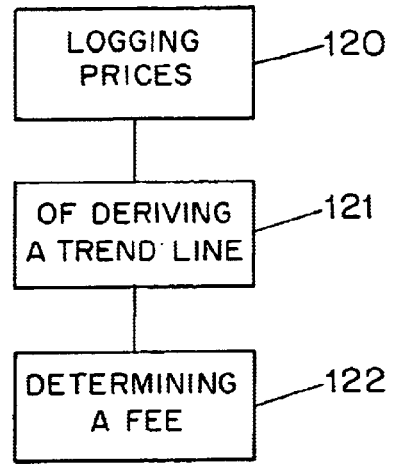
FIGS. 13–18 are flow charts.

FIG. 13 is a flow chart. Shown are a step 120 of logging prices of trades executed within the system; a step 121 of deriving a trend line from said logged prices; and a step 122 of determining a trading fee for a particular trade.

Figure 14:
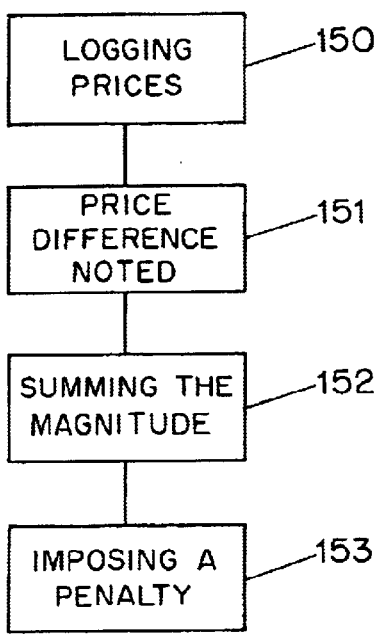

FIG. 14 is a flow chart. Shown are a step 150 of logging prices of trades executed within the system; a step 151 in which, for each particular trade having an actual price and for which the market maker is contemporaneously offering a bid/ask price, the respective difference between the price offered by the market maker for the trade and the actual price is noted; a step 152 of summing the magnitudes of the respective differences a sum; and a step 153 of imposing a penalty upon the market maker as a function of the summed magnitudes.

Figure 15:
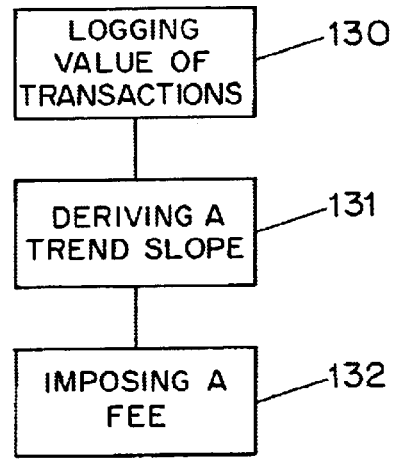

FIG. 15 is a flow chart. Shown are a step 130 of logging the gross value of transactions for the particular currency in a time segment; a step 131 of deriving a trend slope for transactions for the particular currency in a time segment; and a step 132 of imposing a fee upon traders who are selling the particular currency and thus are buying a currency that is not the particular currency.

Figure 16:
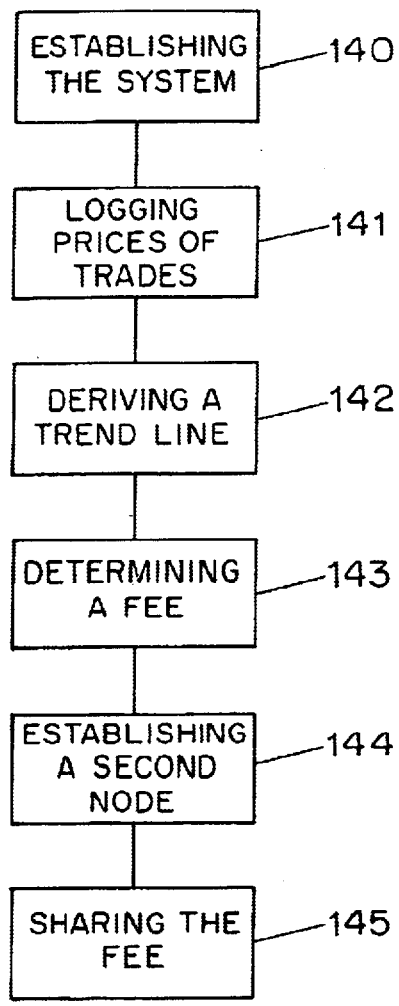

FIG. 16 is a flow chart. Shown are a step 140 of establishing the currency trading system within the first country, a step 141 of logging prices of trades executed within the system; a step 142 of deriving a trend line from said logged prices; a step 143 of determining a trading fee for a particular trade; and a step 144 of establishing within a second country a trading node of the currency trading system; and a step 145 of sharing with the second country the trading fee.

Figure 17:
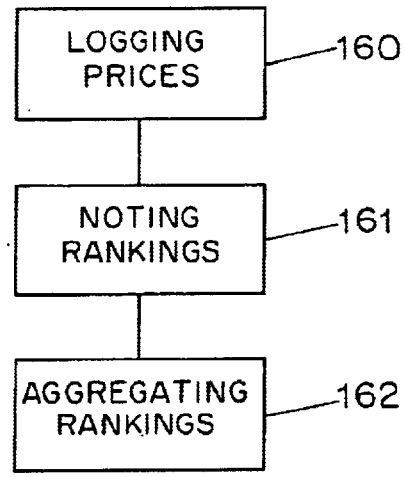

FIG. 17 is a flow chart. Shown are a step 160 of logging prices of trades executed within the system; a step 161 in which, for each particular trade having an actual price and for which the market makers are contemporaneously offering prices, the rankings of the market makers according to each respective difference between the price offered by respective ones of the market makers for the trade and the actual price are noted; and a step 162 of aggregating the rankings.

Figure 18:
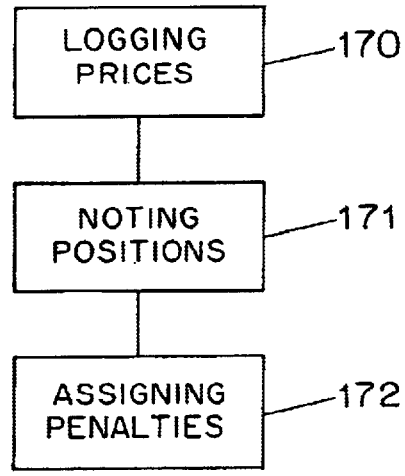

FIG. 18 is a flow chart. Shown are a step 170 of logging prices of trades executed within the system; a step 171 in which, for each particular trade having an actual price and for which the market makers are contemporaneously offering prices, the positions of the market makers according to each respective difference between the price offered by respective ones of the market makers for the trade and the actual price are noted; and a step 172 of assigning penalties to respective market makers as a function of the positions of the respective market makers.

This invention pertains to marketplace systems which include one or more computers acting as central processors and/or servers, and terminals, such as personal computers, located in user's offices or other convenient remote locations, all linked together by one or more high data-rate electronic and/or optical networks. Terminals typically include screen monitors, printers, and other devices now commonly associated with personal computers. In the modern world, such systems can very efficiently and cost-effectively handle a huge load of transactions, thousands of users, and whatever processing load required that only a few years ago might have been thought impossibly large.

The invention applies to all such systems and consists of a set of rules, algorithms, and procedures, many embedded in software and hardware, others under which the market itself is operated by its sponsors and managers, as will be explained. The invention is itself a system that provides advantages for existing marketplace systems or for de novo systems built to take maximum advantage of the invention. Sponsors have complete control of how the advantages are allocated between themselves and the users. Fees may be adjusted by caps and minimums. Billed amounts may be adjusted with discounts or premiums depending on the type of user and/or with volume discounts figured in a variety of ways.

As will be seen, the invention is particularly useful and beneficial for markets where there are a large number of similar transactions over a time period of a day or so for each item traded on the market. In this case the parties are typically represented by professionals, called traders. Items are best identified by relatively short descriptions so that parties to the transaction readily know quickly and exactly what is being transacted and all governing terms and conditions. Descriptions may reference, implicitly or explicitly, standards and specifications which have no limit to their complexity as well as photos, videos, etc.

In the system according to this invention, transactions made through the system must be reported to the system, preferably by both parties. Alternatively, the execution of the transaction may take place on the system itself as soon as the parties agree on (1) the item, (2) usually also unit price and quantity and (3) sometimes terms of delivery and settlement, and other details. Some information on the item may be implicit or covered by the rules of the marketplace. If a purchase and sale, the item can be an option, a future transaction, a forward transaction, a barter transaction (or swap), or have other conditional terms depending on future events, such as a well-known market index reaching a certain value.

In particular, the invention relates to how the payments made by users to sponsors for the use of the system are determined. Such payments could be used in any of the following ways:

covering the costs of operation and maintenance of the system, profiting the sponsors, covering the costs of emergencies and outages, financing system upgrade, enlargement and extension, building surplus for unspecified purposes, and for other purposes appropriate for a particular market but differing from market to market, such as providing for educational, charitable, eleemosynary or other public purposes, insuring or protecting one or more classes of users or sponsors who may put up risk capital or otherwise be financially exposed and whose presence and services to the market make it work efficiently, smoothly, and without undue fluctuations in price or activity that distorts the market or is unfair to many users.

In this invention some or all of the payments made for such purposes come from transaction fees, calculated by the system and charged to each party to a transaction. A key concept of the invention is that the fees charged automatically to the two parties of a transaction are generally (1) different and (2) small. If, aside from the fee, the transacting parties agree to a certain price, the presence of the fee will seldom if ever result in a party backing away from a transaction. It is true that fees will generally be very small compared to other transaction costs or essentially negligible, but provisions are included so that both parties will willingly proceed even when that is not the case, because the benefits provided by other features of the system are more important to them.

Fees are of several types, accumulated transaction by transaction, considered separately and then combined according to the market's rules for allocating charges between different fee types. Users are regularly billed for total fee charges from time to time, like monthly.

Purpose Fees

The first fee type is a fee depending on the purpose of the transaction. This capability is included in the invention to accommodate to the situation where the sponsors believe that user fees should depend on the purpose of the transaction, which is often different between counterparties. User purposes serve as a non-trivial example in the FX or foreign exchange market listed in Table 1. Each user indicates transaction purpose at the time of consummating a transaction. It is anticipated that most users will participate by means of traders for whom speed and ease of use will be essential. A single key stroke may (1) indicate purpose according to a sponsors Purpose Code table and at the same time, if desired, (2) cause the execution of the trade. Sponsors may occasionally change purpose codes, but should do this rarely since it requires all traders to switch to new codes which may be difficult in a very large market.

TABLE 1

Categories of Transactions by Purpose (example for FX)

Transactions are executed in order to facilitate, make payments toward, or arrange for the following
1. international delivery of all legal goods, services, and software (including cyber services).
2. direct investments in or acquisition of foreign, non-financial assets, operating companies and properties.
3. international travel.
4. (with respect to the portfolio of a resident/citizen of a country initially largely holding assets denominated in the currency of the country including the currency itself) seeking to obtain more diversified holdings and to achieve a reasonable portfolio balance.
5. gift or contribution to individual/organization/charity.
6. personal or business loan, carrying no investment-features.

TABLE 1-continued

Categories of Transactions by Purpose (example for FX)

7. portfolio investments in foreign financial assets or financial companies.
8. (wholesale and retail) broker/dealer distribution function, efficiently placing portions of a relatively large amount of a currency originating from a transaction into the hands of many different parties who desire relatively small amounts.
9. hedging balancing a portfolio as in (4) except that in this case the portfolio is not one being managed for, or on behalf of, a resident/citizen.
10. arbitrage (true) one or more trades that when executed simultaneously can produce a profit for the arbitrageur, the profit arising from the variation of bid/offer prices available at the same time on different exchanges/regional markets.
11. arbitrage (speculative) same as (10) except that one or more of the bid/offer prices is known only speculatively while the remaining quote(s) is/are known to be real.
12. (pure speculation) an execution by a party to a trade based on the party's belief that coupled with other transaction(s), the transaction will produce a profit or reduce a loss, with the key proviso that this category covers only cases not covered under previous categories.
Trades outside these 12 purposes or undisclosed can be assumed to be for tax-avoidance, money laundering, or other illegal purposes.

The size of this fee can be determined independent from other fees as a matrix of specific fees for trades of specific purposes and specific sizes, or may be incorporated as part of the market timing and crisis fee calculation as illustrated in the next section.

Market Timing Fees

The second fee type is a new concept, a fee for market timing. Such a fee would have been impractical before two recent technological developments, the vast increase in network bandwidth and the great compression of processing time. Furthermore, such a fee was not important in many markets before achieving high trading volume and speed became extremely important. This fee is only appropriate if there are many transactions in a single item over a relatively short time period, like an hour, day or week. This fee is computed by different formulas in successive time intervals, called time segments. As soon as a segment ends the next one begins. The end of a segment may be determined by any of several different choices of segment determination, such as:

(a) clock-related, like every hour, day or week;
(b) trading volume-related, when a certain amount of trading has executed in an item since the beginning of the segment;
(c) mixed, e.g., same as (b) except that if a minimum number of trades have not taken place, the segment end is delayed until the minimum number has been reached or a clock-related additional time period elapses, or a combination of the two; or
(d) the boundary between two adjacent segments is adjusted to improve the fit of the best-fitting curve over the total time interval of the adjacent segments.

Figure 1:
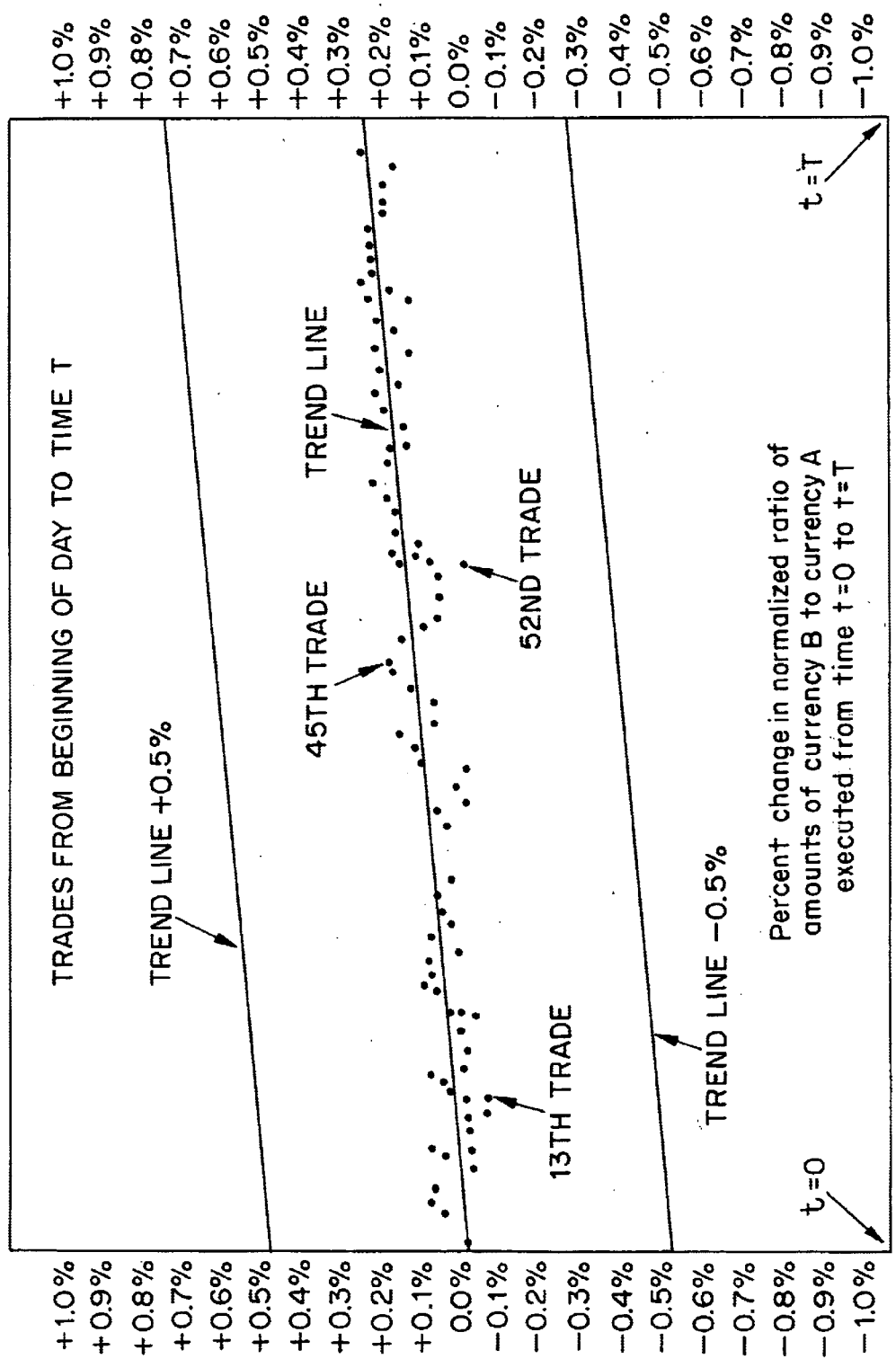
FIGS. 1 and 2 are scattergrams showing derivation of typical trend lines.
Figure 2:
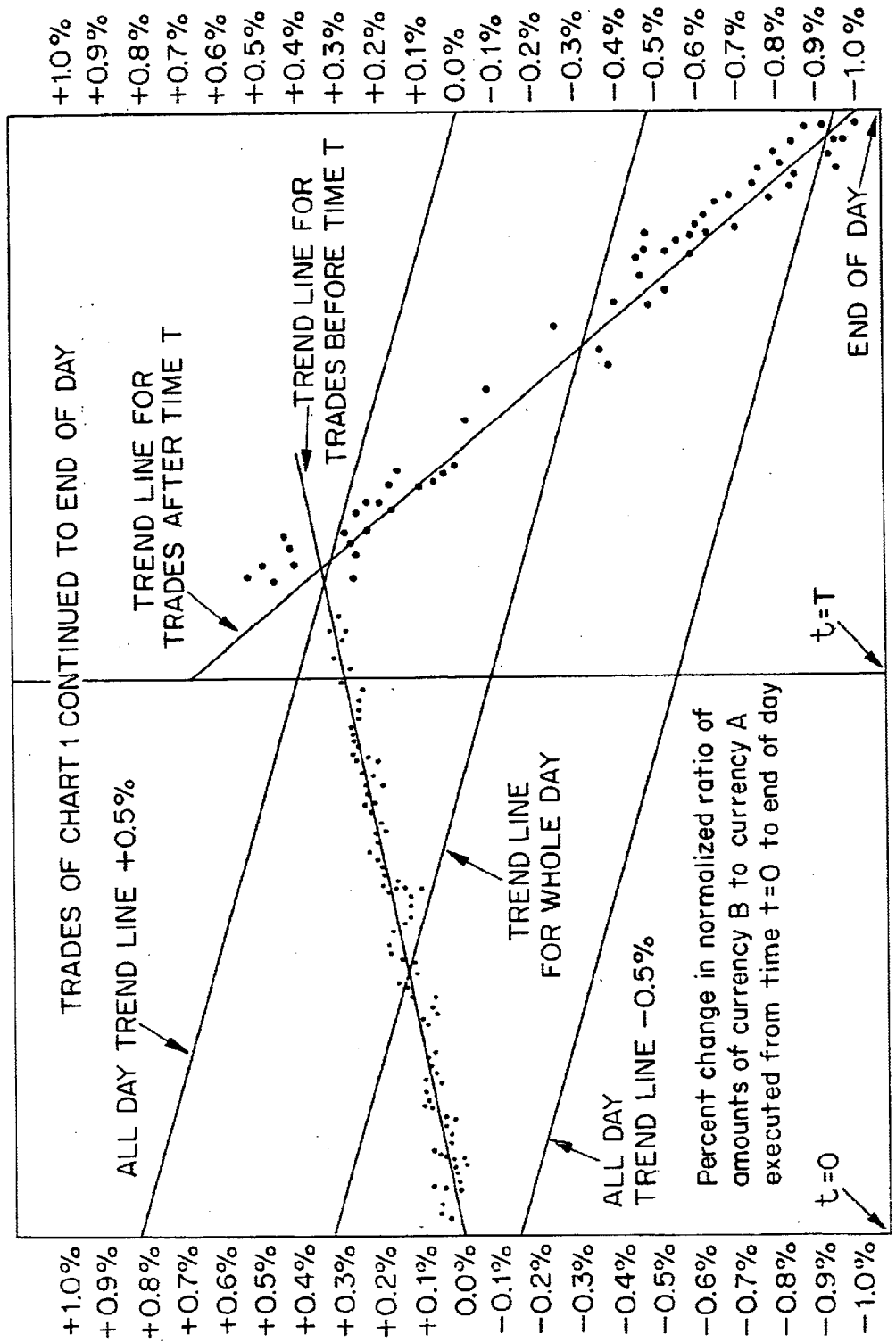

FIGS. 1 and 2 show two examples of a price-versus-time scatter diagram of points, whose ordinate is the reported unit price expressed as a percent of a reference price (such as the unit price of the first trade of the segment), and whose abscissa is the reported time of execution. The total value or amount of a transaction is the unit price multiplied by the size (also sometimes called "volume"). The activity in each item produces a different diagram, and different items may have different time segments. There is a point on a scatter diagram for every trade reported in the item during the time interval covered by the diagram (which may be more than or less than a segment). Such diagrams normally show a scatter of points around a price trend line for a period of time after which the trend may change. FIG. 1 is an example for a period of time T. At any given point in time, when that is the current time, no one knows for sure how the trend line may shift over the whole segment, when the segment ends.

The plane of the scatter diagram is the (t,r) plane; t (for time) versus r (for ratio of unit price to reference price). A formula for the trend line as the straight line best-fitting all the data points is developed below. FIGS. 1 and 2 are examples of two scatter diagrams for the same item and the same day. They show the same single trend line for the time interval from t=0 to t=T. FIG. 2 shows a new trend line beginning at t=T and following through to the end of day. Larger trades, representing a greater size, should to some degree be weighted to have a greater effect on the location of the best fitting trend line. The weighting, w, should be a function only of r, expressed as w(r) and could be the actual amount A(r) in dollars or other currency or standard of value, i.e., W(r)=A(r). It is usually best not to have the weighting equal to the volume of the transaction because of the importance provided by a volume discount in many markets as well as the desirability of higher weightings for very small trades to avoid de minimus fee distinctions. A simple arrangement, called the sponsors Size Weighting Table, may provide for weightings versus size of trade. See Table 2 for an example of such a table, where the weighting grows roughly logarithmically with size. This arrangement might be appropriate for a market, like the foreign exchange market, where size ranges over five orders of magnitude or more. For example if the size of a transaction were $150 million, according to Table 1, the weighting would be $17,450; a large number, but equal only to 0.01163% of the amount of the transaction. It is important to note that the weightings are not the fees and, depending on the parameters chosen for calculating the fees, may have little to do with the fees.

TABLE 2

Example of Volume Weighting Determining Best-Fitting Lines (Curves)

| Portion of Dollar Amount of Trade (Higher # is "breakpoint") | Weighting as a percent of size | Examples. Weight of Trades at Breakpoints |
|---|---|---|
| First $10,000 | 1.0% but not less than $1 | $100 |
| Next $10,000 and $100,000 | 0.5% | $550 |
| Next $100,000 and $1 million | 0.1% | $1,450 |
| Next $1 million to $10 million | 0.05% | $5,950 |
| Next $10 million to $100 million | 0.01% | $14,950 |
| Next $100 million to $1 Billion | 0.005% | $59,950 |
| Part over $1 Billion | 0.001% | |

The weightings, whatever they may be, are determined automatically by the system computer(s) from the weightings formula or table, as the case may be, and fed into the best-fitting trend-line formula as described below. Within time segments established by one of the methods described above, the best fitting line can be used to determine the market timing fee. For this purpose the sponsor chooses a formula for assigning fees depending on departure from the best-fitting line, measured vertically along the ordinate (see FIG. 1 or 2), of each transaction from the best-fitting line. In this case the best formula will be provided by a table, a sample of which is shown in Table 3, since the fees rise incrementally by amounts so small that the users generally consider each increment negligible compared to other transaction costs and negligible compared to the improvement in price the buyer or seller receives for market timing.

Figure 4:
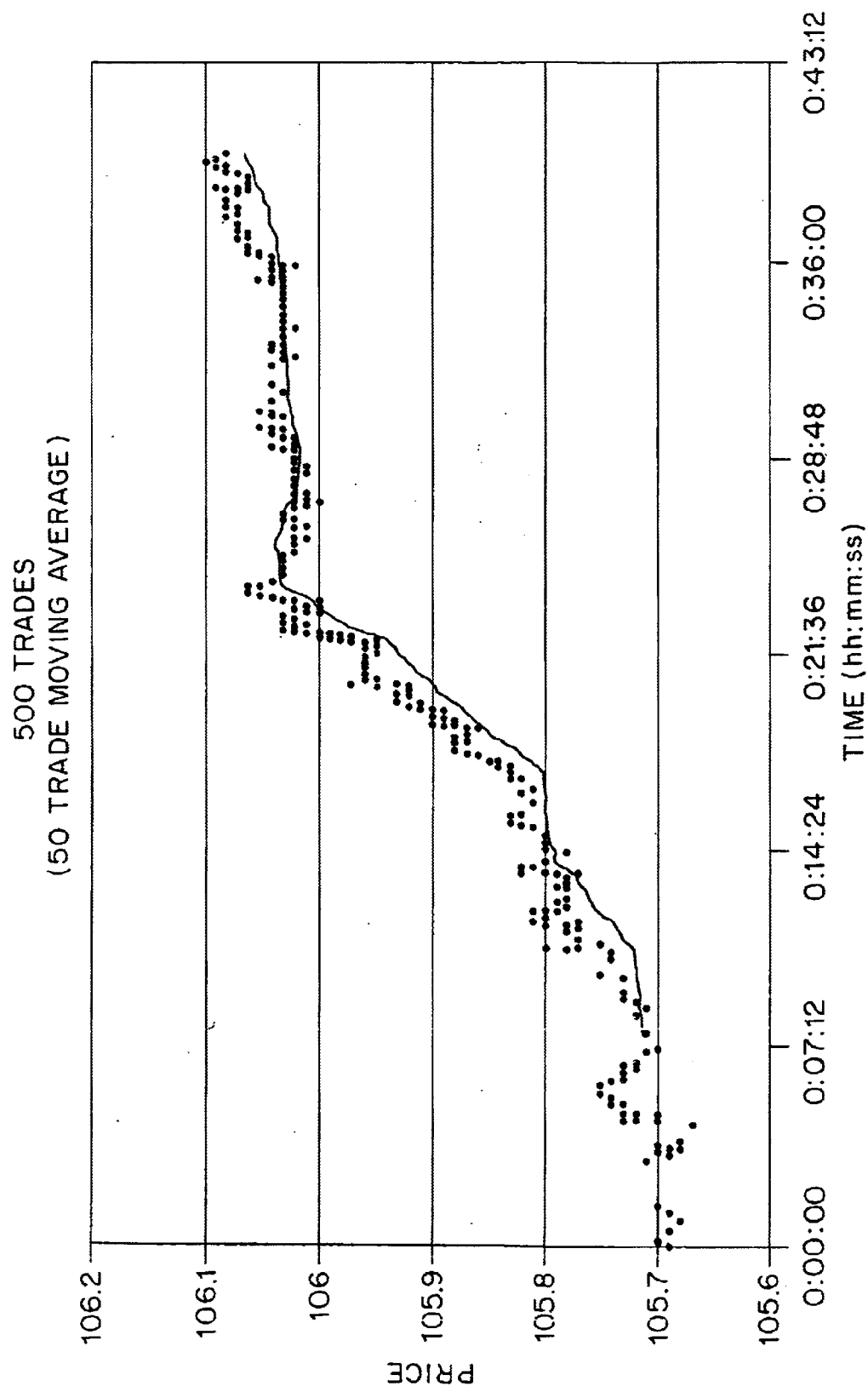
FIGS. 4 through 11 show actual time-series data for trading on a particular day, with moving average curves shown in FIGS. 4 and 5, and best-fitting curves of increasing polynomial order shown in FIGS. 6 through 11.
Figure 5:
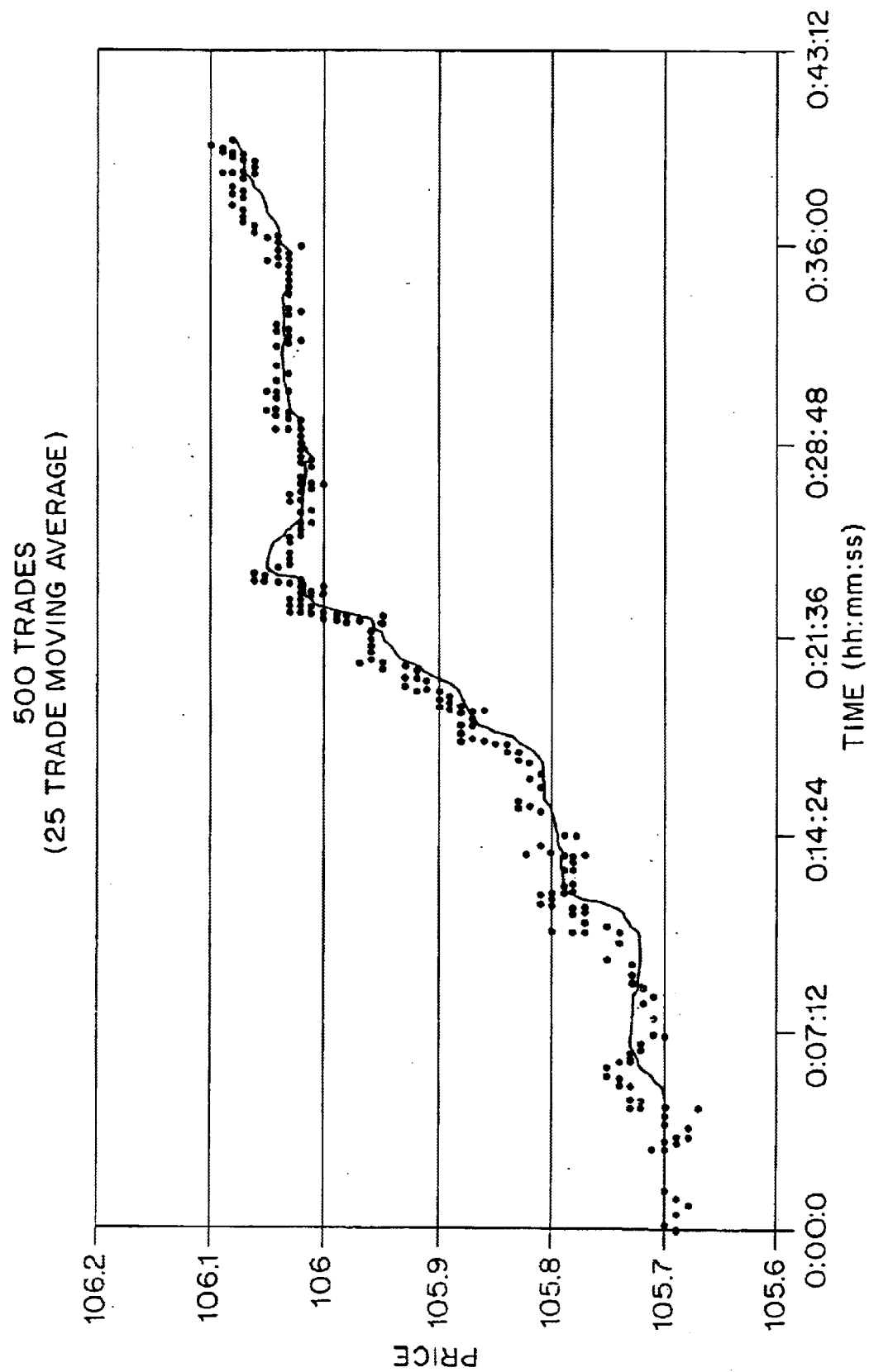

Despite the advantages mentioned above, in some markets (1) an average of the transaction prices in a segment or (2) a moving average may be more acceptable because either of these options is simpler and more familiar to user. In the moving average case (2), time segments may be differently defined. A time segment begins N trades back and ends after each transaction, where N is a parameter which may be determined as empirically reasonable. In this case the trader, unlike the situation in the preferred methods of the preceding paragraph, can calculate the fee before committing to the transaction. When the fee gets significant, as in the case of the "crisis" fee, which may be in the range 0.5% to 2% or higher, the trader should be informed of the size of the fee before committing to a transaction. Examples of such segments for 500 sequential yen-dollar exchanges with values of N of 50 and 25 are shown as FIGS. 4 and 5, respectively.

As an example of how Table 3 can be used, suppose the transaction takes place at a unit price exactly 0.5% above the trend line. Then, compared to the situation where the price would be exactly on the trend line, the seller did better financially than the buyer by exactly one percent. The seller is required to pay a fee to the system of 0.01%, which is itself very small, only one percent of the seller's benefit from fortuitous market timing. We use the word fortuitous recognizing that it is possible that the benefit may in some cases be legitimately credited to superior market intelligence, insights, intuition, or market power. The sponsor(s) will be provided with an option between two treatments of this fee: (1) illustrated in table 3, the system sponsor, not the uncharged counterparties, receives the fee, and (2) the system sponsor does not receive the fee, the uncharged counterparties do. In case (1) sponsors' revenue is increased and in case (2) sponsors receive no increase in revenue, but system stability and user good will are greatly increased, so that sponsor market share will be maintained or increased. Sponsors must choose wisely between these two courses of action. The system may go on line with one choice and switch to the other later. The option design must take into account that switching may occur rarely or never, but still should be a simple matter.

TABLE 3

Sample Market Timing Fee Table
Fees, expressed as a percent of transaction value

| | Percent transaction is below (above) Trend line (or curve) | | | |
|---|---|---|---|---|
| | If below | | If above | |
| | Buyer | Seller | Buyer | Seller |
| Less than 0.5% | A base charge for each transaction: e.g. for both buyer and seller the greater of .001% or $10 | | | |
| 0.5% to 1.0% | .01% | 0 | 0 | .01% |
| 1.0% to 1.5% | .02% | 0 | 0 | .02% |
| 1.5% to 2.0% | .03% | 0 | 0 | .03% |
| 2.0% to 2.5% | .04% | 0 | 0 | .04% |
| Etc. | | | | |

The base charge in this example is a fixed minimum, 0.001%, even smaller than the smallest increment of 0.01%, with an absolute minimum of $10 and is charged the same to both buyer and seller, as the basic cost/value of partici- pating on a system which is paid for by transaction fees and charged by the transaction. Aside from the minimal base charge, these additional fees for a market timing benefit is between one hundredth and one two hundredth the size of the benefit.

Use of the best-fitting trend line as the standard for determining a benefit for market timing, rather than a fixed reference (such as the opening or closing price, or an average or moving average of prices) is based on the concept that fees should not prejudice or affect market trends in any way. The market should move in response to buying and selling interests as a free market. Price movements in an ideal free market are there to adjust supply and demand, to send honest, undistorted signals to the users.

Figure 6:
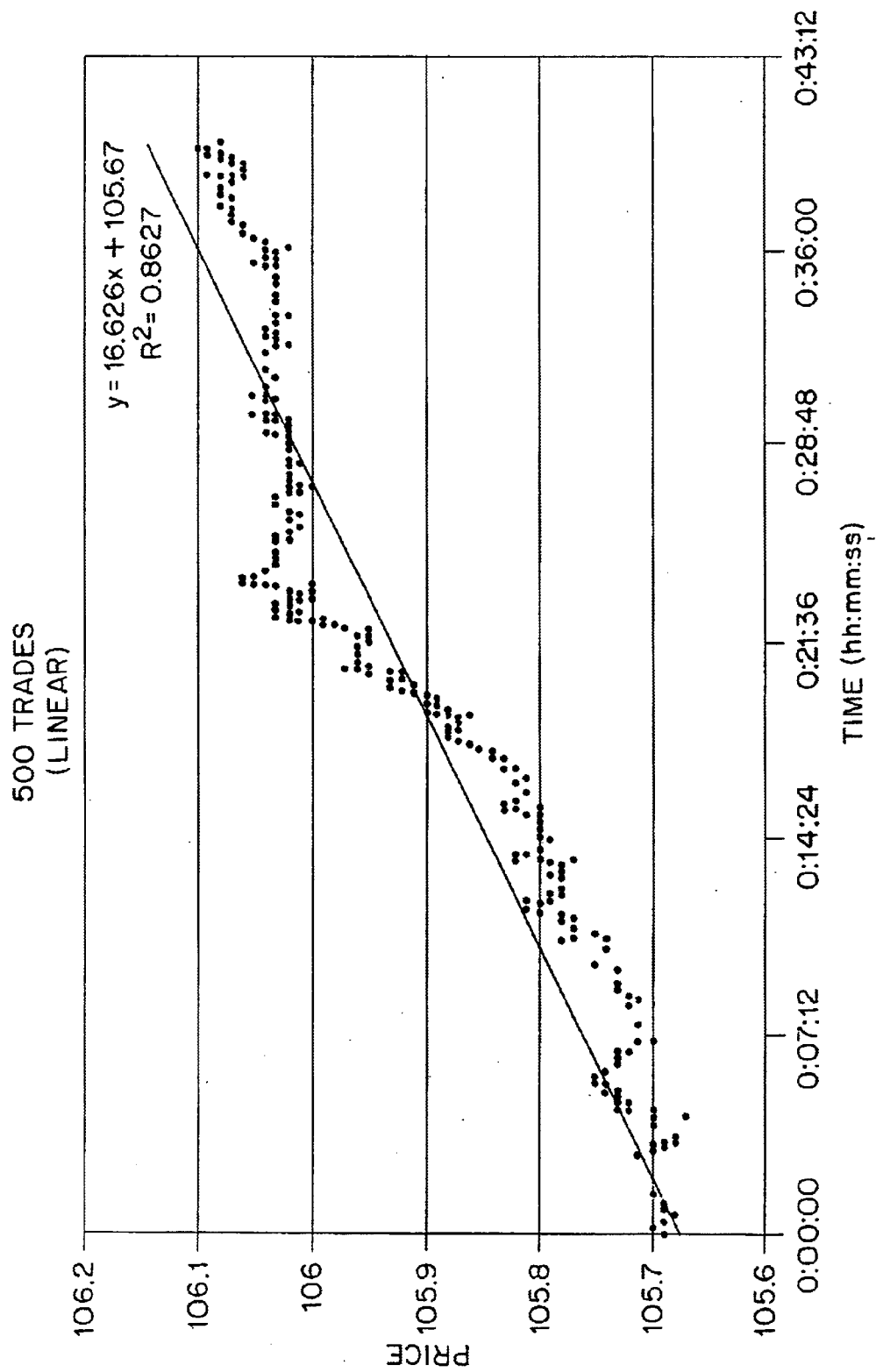
Figure 7:
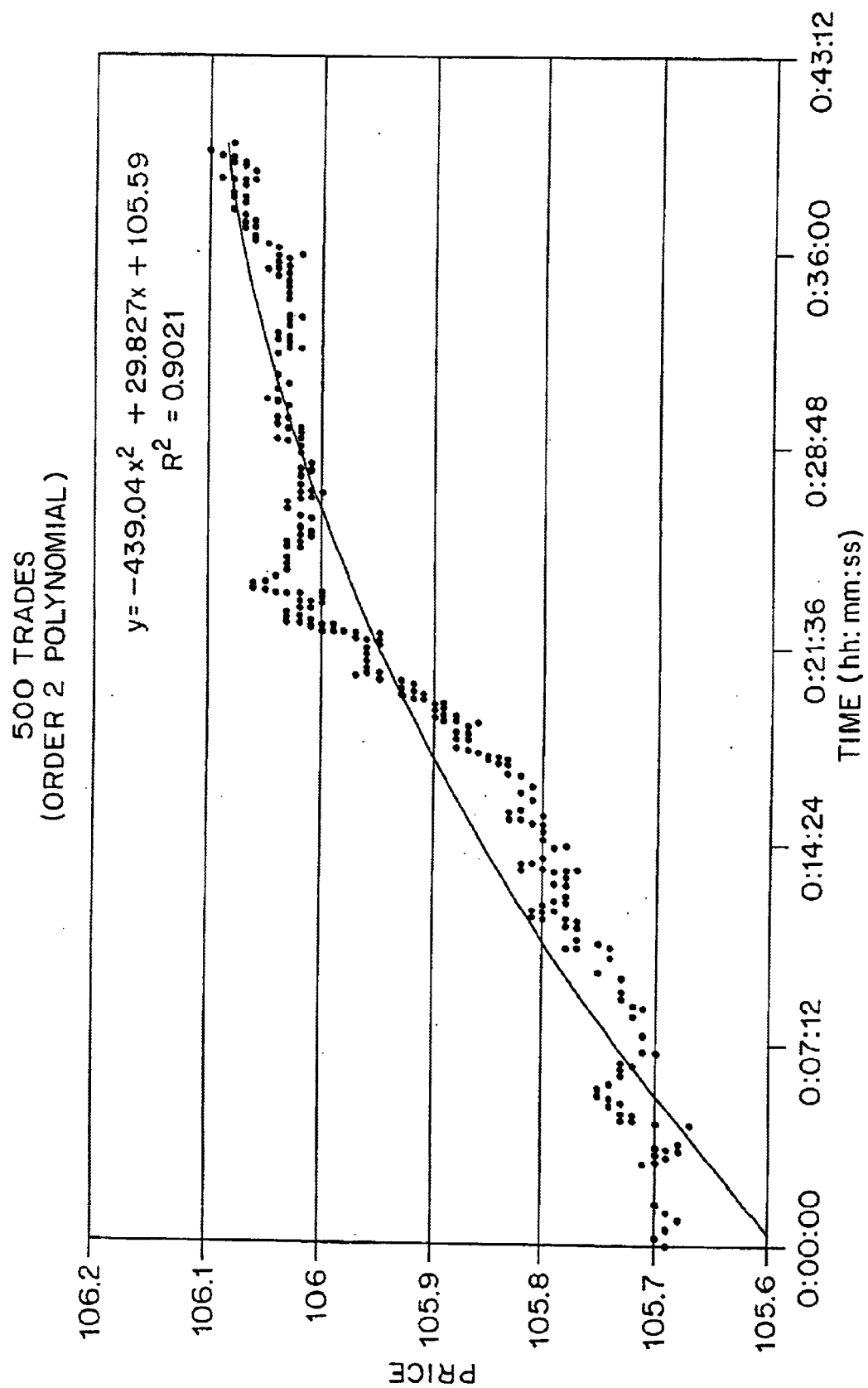
Figure 8:
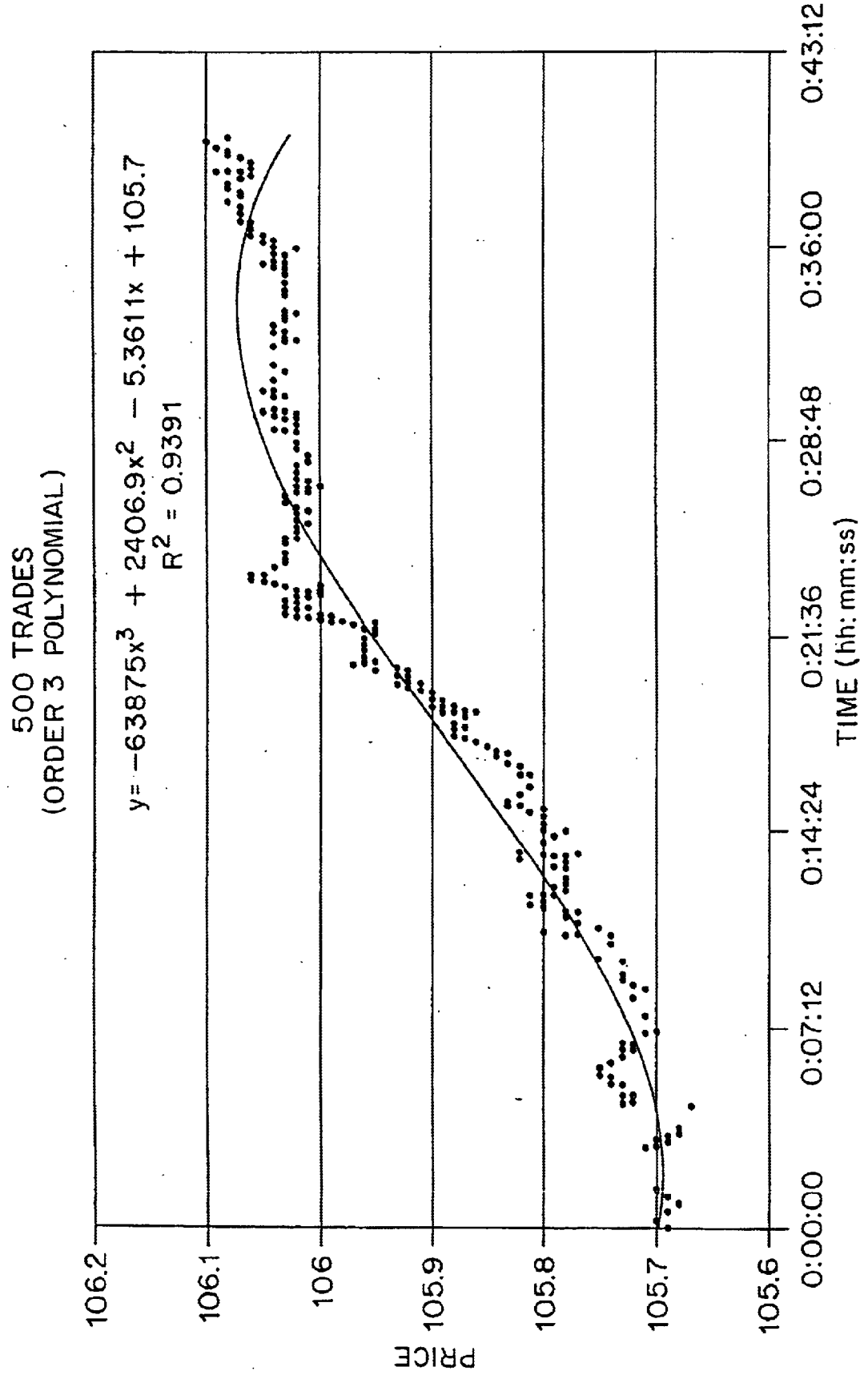
Figure 9:
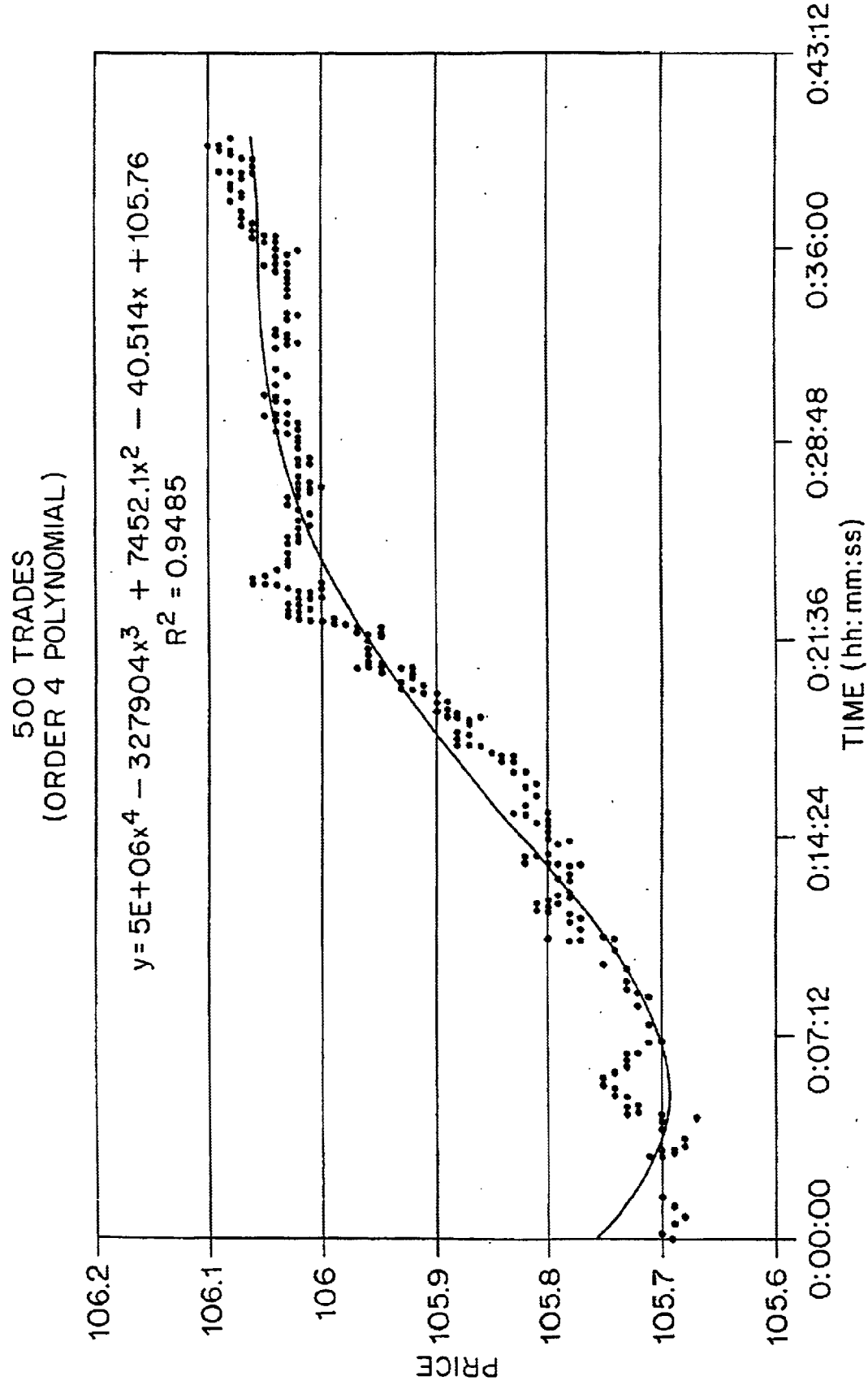
Figure 10:
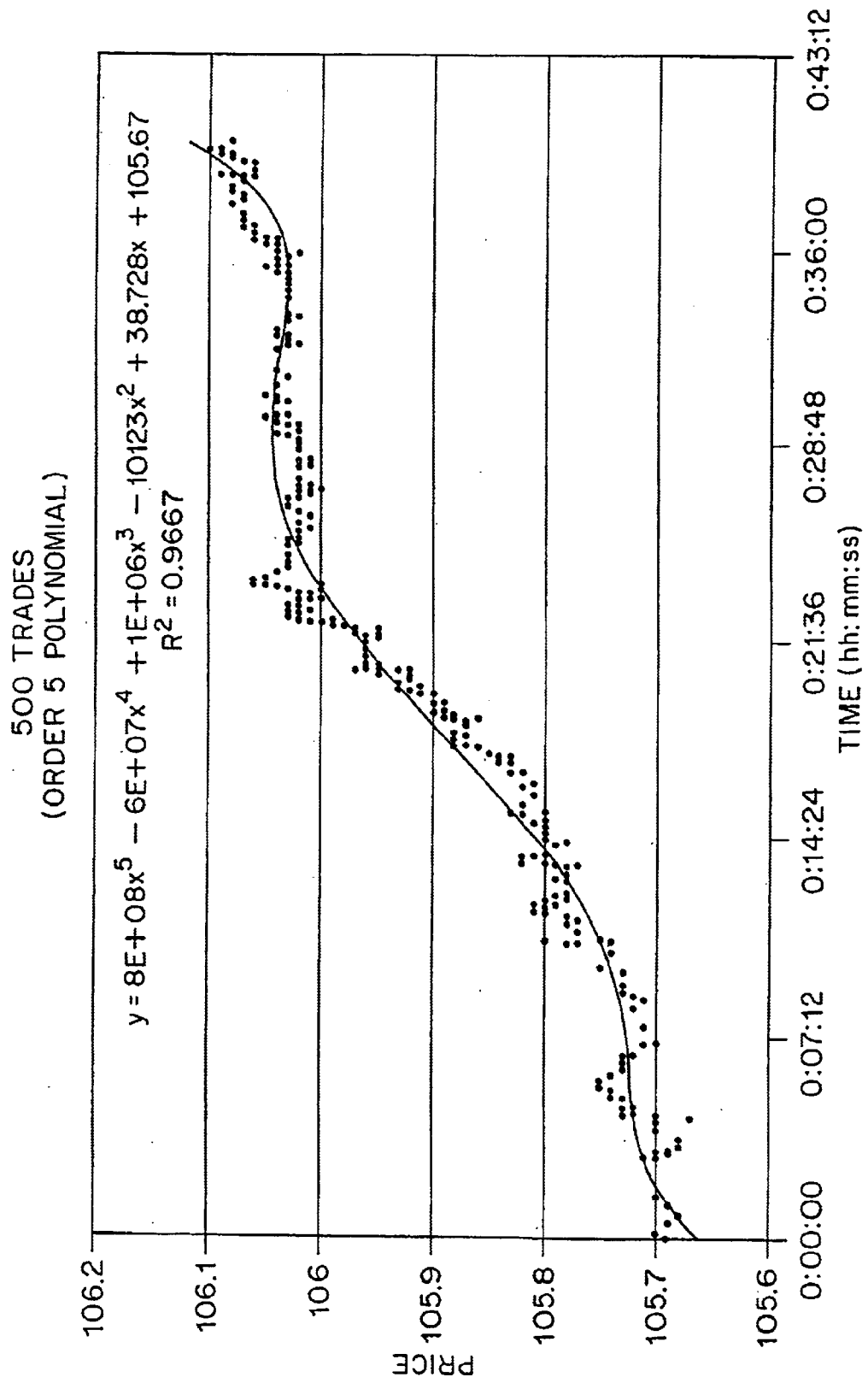
Figure 11:
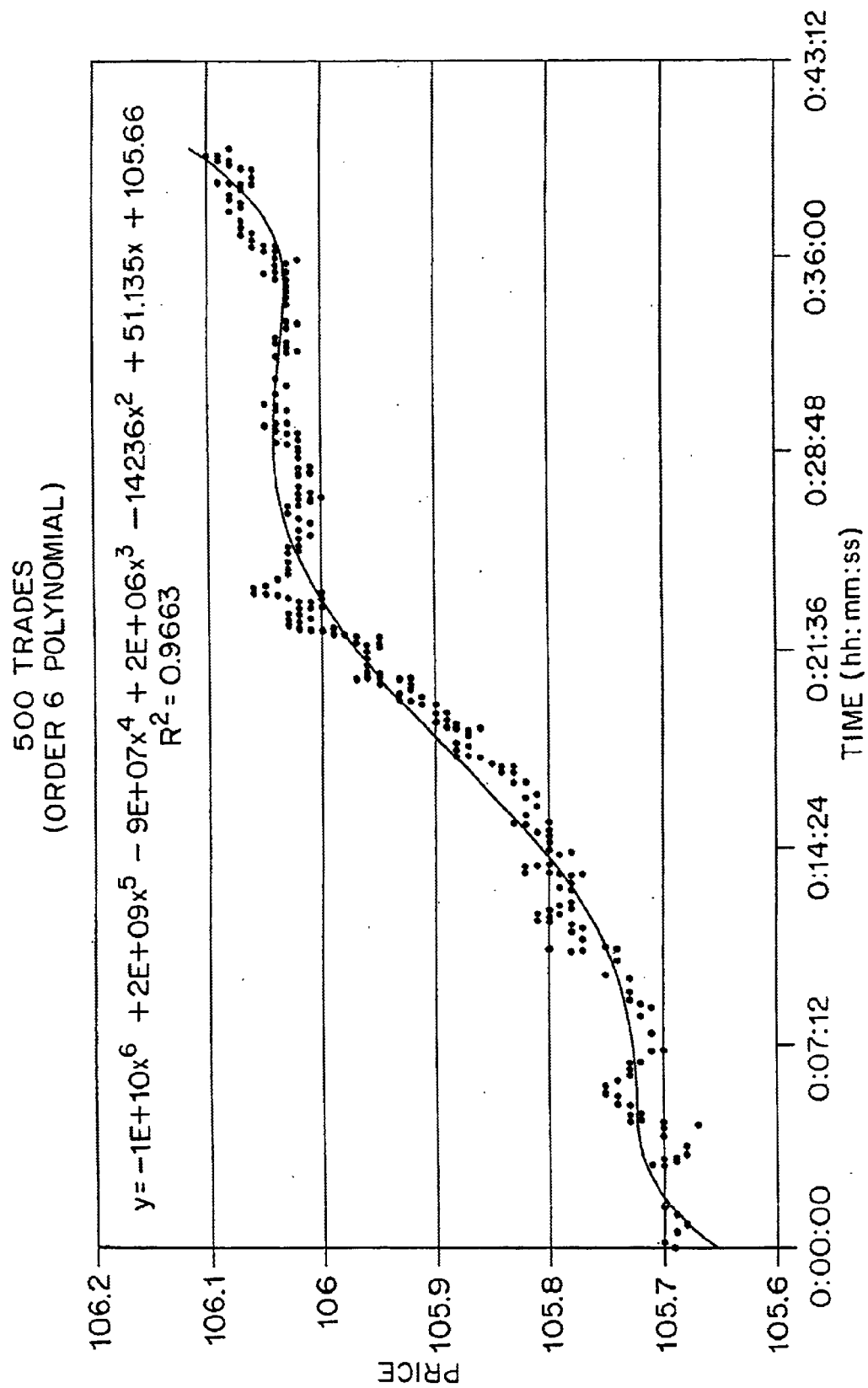

To make the timing fee work as well as it should, it will be necessary that the method of determining the best-fitting trend-line should be impressive to the naked eye, since price/time scatter diagrams will be generated for a large variety of items over many days of trading and under many different market conditions, with the purported best-fitting curves plainly visible. FIG. 6 illustrates how the best-fitting trend line can appear to the eye to fit the data of FIG. 4 quite well. Any discrepancy that appears to be unfair and inaccurate will be readily spotted and could cause dissatisfaction and loss of user support. This effect will be ameliorated by capping this fee at a small percentage of the benefit, like 1 or 2 percent.

Traders will generally enjoy paying these fees for psychological reasons. The effect is expected to be similar to that experienced by a person who has had a piece of good fortune and enjoys treating friends to food and drink to share the happy moment. With this analogy in mind, one can speculate that the cap may actually be made much higher than 2% of the benefit, say 10%, without diminishing this big spender ("the drinks are on me—let's celebrate") effect. While a high fee will produce much more revenue for the system, it would also work toward aiding some alternative marketplace to cut into the high market share of the system sponsor(s) and, though tempting, should be avoided because of the importance of market share for e-commerce markets.

In the case of the fortuitous market timing fee in the FX market, whenever the transaction is the consummation of commitments made at an earlier date, such as by the use of futures, forwards, and/or options, the fee must be adjusted for the difference in short term interest rates prevailing at the earlier date as they apply to the two currencies which are being exchanged in the transaction. This difference may substantially reduce or increase the benefit of the beneficiary (and hence the fee charged) and indeed may turn the counterparty into a beneficiary and subject to the fee.

The intention of the invention is to have fees affect the market as little as possible. Very small fees, charged against those who have benefitted most from fortuitous tinting is an important way to do this. But that is not all that can be done with this approach. Up to this point, we have considered the standard by which fortuitous timing is measured to be a sequence of best-fitting straight line segments, independently determined in each time segment as determined from the choices of FIG. 2 or otherwise. At the juncture of two time segments (the end of one and the beginning of the next) the best-fitting lines of the two segments do not necessarily connect (see FIG. 2). Under hectic market conditions the values of r of these two adjacent segments may be quite far apart at the point in time where the segments meet. It is possible to replace the disjointed line segments by a smooth curve that improves the fit to the points of the scatter diagram and lowers some fees at times when the trend line segments are most disjointed. FIGS. 7–11 show trend curves (calculated as best-fitting polynomials of varying degrees) with even slightly better fit, but these examples may not handle the case of price trend reversal (up-to-down or down-to-up) such as illustrated in FIG. 2. The section, "Mathematical Techniques," explains how to do this. In one promising case, the straight line segments alternate with tangential best-fitting parabolic arcs so that both the segments are continuous and smooth (i.e., the derivative, in the mathematical sense of that word, is continuous). Other methods, discussed in "Mathematical Techniques" are also possible and can be readily programmed, as they appear promising.

Table 5 illustrates how purpose, either as a premium or discount, may be factored into the total fee charge with three purposes illustrated generically as: 1 favored, 2 standard, 3 discouraged. In the standard case 2, the transaction fee can be calculated from tables such as shown in Tables 3 and 4, unchanged because of the standard purpose. If the same trade were for a favored purpose, the fee would be cut in half and for a discouraged purpose, it would be doubled. The sponsors are of course free to make their own tables with specific purposes and fee factors at any levels they choose, larger or smaller.

In some markets, the percentage fees of the sponsor's Market Timing Fee Table may need to be adjusted for transaction size. One method for doing that is to have a table such as the one shown in Table 3 apply to trades up to a standard size, for example up to a $1 million trade, and a further table, the Market Timing Fee Table for large trades (over $1 million), such as Table 4. Note that in view of the possible usefulness and fairness of a smooth curve rather than disjointed line segments, Tables 2 and 3 use the term "curve" rather than "line". Thus, herein when the term "trend line" is used, it preferably embraces trend curves.

TABLE 4

Market Timing Fees for Large Trades
For each 0.5%[1] away from[2] the best-fitting
trend curve at the time of trade the fee for large trades
can be determined from the percentages in the second column

| Size of Trade | Portion toward fee |
| --- | --- |
| First million | .01%. up to $100 |
| Next $1 million to $10 million | .005%. up to $450 |
| Next $10 million to $100 million | .001%. up to $900 |
| Next $100 million to $1 Billion | .0005%. up to $4500 |
| Over $1 Billion | .0001% |

[1]beyond the first 0.5%
[2]below the curve (for buyer's fee) and above the curve (for seller's fee)

As an example of using Table 4, suppose a $500 million trade is executed at a price 2.5% above the trend curve. In this case the seller pays a fee of $13,800.

The dependence of this fee and other fees upon purpose could be similarly calculated from Table 5.

Fee scales are chosen, as in Table 3 and Table 4, so that this fee, though occasionally much larger than the base-fee, also remains small enough to be unnoticed or insignificant. Scales should generally be capped at low values such as 1 or 2 percent so that this fee is not more than a small percentage of the benefit.

TABLE 5

Sample of Table for Calculating the Effect of Purpose Code

| Purpose | Fee factor |
| --- | --- |
| 1. (A favored purpose) | 0.5 |
| 2. (A standard purpose) | 1.0 |
| 3. (A discouraged purpose) | 2.0 |

A key idea for this method of determining market timing fees is that the market cannot know the amount of the fee until after the time segment ends for which the best fitting curve is calculated. All that users know is that the fees will be small and reasonable and negligible in the big picture. This will minimize the possibility of the potential fee having any effect on what trades will execute and at what prices. The potential for traders playing games with these variable fees is essentially non-existent.

Mathematical techniques for defining price trends to closely track real transaction scatter diagrams. In this section, we give precise mathematical formulas for determining the best fitting line from any price ratio sequence. These trend lines can be determined with today's computers virtually instantaneously. We also explore the feasibility of approximating these scatter diagrams by higher order polynomial curves to allow for the fact that from time to time in every market, trends change and so trend lines change. There is little wrong with approximating any scatter diagram by a series of straight line segments forming a "broken curve". However, following a given trend line that is about to change, before a clear new trend emerges, there may be many points that form almost no trend. After the fact, when the new trend is clear, there seem to be clear advantages to approximating a region where the trend is not clear with a best fitting parabola. This idea of following trends by a smooth (differentiable) curve consisting of alternating straight line segments and parabolic segments, turns out to be quite attractive.

The Best-fitting Line. In traditional plane geometry notation, let the Cartesian coordinates of N points be $(t_n, r_n)$, n=1,2, ..., N. The nth point represents a trade at time $t_n$ at a ratio of prices $r_n$ (price of the item in a given currency, say dollars, compared to a reference price, such as the price at the beginning of a time segment):
In the case of FX $$r_n = B_n/A_n,$$

where $B_n$ is the amount of one currency to be exchanged for $A_n$ the amount of the second currency, or more generally where two parties have contractually agreed to abide by the terms of an instrument according to which the first party at time $t_n$ obtains, or accepts an amount $B_n$ of currency B (or some other consideration valued at $B_n$ in currency B) in exchange for transferring (or giving) at the same time ($t_n$) to the second party some amount $A_n$ of currency A or some other consideration valued at amount $A_n$ in currency A at time $t_n$.

Let the axes of the plane be as follows: horizontal or abscissa, T, for time; and vertical or ordinate, R, for price ratio. Let the equation for the best-fitting line be $$R = \lambda T + \mu, \qquad 1.$$

where $\lambda$ is the slope of the line and $\mu$ is the R-intercept. One definition of the best-fitting line is the line defined by values of $\lambda$ and $\mu$ for which the root-mean-square of the vertical scatter of points is minimized. This occurs when $$M = \sum_{n=1}^{N} (R_n - r_n)^2$$

is minimized with respect to $\lambda$ and $\mu$, where $$R_n = \lambda t_n + \mu. \qquad 3.$$

By a simple application of the calculus of variations, $\lambda$ and $\mu$ are defined by a pair of linear equations:

$$C = \lambda E + \mu F \qquad 4.$$

and $$D = \lambda F + N\mu \qquad 5.$$

and $$C = \Sigma t_n r_n, \; D = \Sigma r_n, \; E = \Sigma t_n^2, \text{ and } F = \Sigma t_n. \qquad 6.$$

This pair of equations linear in both variables is readily and uniquely solved as:

$$\lambda = [NC - FD]/[EN - F^2] \qquad 7.$$

and $$\mu = [ED - FC]/[EN - F^2] \qquad 8.$$

By the Schwarz inequality, EN is always greater than $F^2$, except for the degenerate case when all the $t_n$ are equal. In the general case, the best-fitting line is unique. In the degenerate case, which is irrelevant for our purposes, the line may be indeterminate.

If the N points are weighted by positive factors. $w_n$, n=1, 2, . . . , N, because the trades are not all the same size, the same procedure yields a more general result: with new parameters, $$C' = \Sigma w_n t_n r_n, \; D' = \Sigma w_n r_n, \; E' = \Sigma w_n t_n^2, \; F' = \Sigma w_n t_n, \; G' = \Sigma w_n \qquad 9.$$

the best-fitting line has slope $\lambda$ and R-intercept $\mu$ $$\lambda = [G'C' - F'D']/[E'G' - F'^2], \; \mu = [E'D' - F'C']/[E'G' - F'^2] \qquad 10.$$

Best-Fitting Higher Order Curves. Except for a degenerate case of no practical importance for our purposes, a unique polynomial of degree N can be found that passes through N points, $(t_n, r_n)$, n=1, 2, . . . ,N. In principal we have a perfect-fitting curve for any scatter diagram with N points. This is a generalization of the N=2 statement that a unique straight line passes through 2 given points, or if N=3, there is a conic section passing through four or three given points, depending on whether it is quadratic in both variables t and r or only in t alone. But this approach seems impractical as the following example shows.

Start with any fourth degree polynomial with all real and different roots at times, $t_1, t_2, t_3, t_4$:

$$df(t)/dt = f'(t) = (t - t_1)(t - t_2)(t - t_3)(t - t_4) = \sum_{i=0}^{4} a_i t^i$$

where f'(t) is the "derivative" of a function f(t) in the mathematical sense, not in the financial sense. Multiplying the polynomial out in (11) and integrating it, as we used to do in first year calculus, for some real numbers $a_i$, i=0 to 4, we have a fifth degree polynomial with two maxima at $t_1$ and $t_3$, and two minima at $t_2$ and $t_4$:

$$R = f(t) = \sum_{i=1}^{5} a_{i-1} t^i / i.$$

It is not hard to show that there are an infinite number of straight lines with different values of $\lambda$ and $\mu$ which intersect this curve at five different points. The fifth degree polynomial which passes through five of those collinear intersection points (or points very close to them, close enough so that for all practical purposes the points appear to lie on a straight line) is unique and must be the original fifth degree polynomial in eq. 12. From this example we can conclude the following, well-known to practitioners who have done extensive approximating of curves by polynomials: Fitting a high degree curve through points very close to a straight line will produce maxima and minima not at all respectful of the appearance of almost no scatter of the original points from a straight line.

If a scatter diagram suggests there should be one or two inflection points (changing from increasing to decreasing once or twice), fitting a second or third degree curve may handle some kinds of inflection points better than two or three straight lines in the sense that points off the curve near the inflection point may be more reasonably classified as to whether they are off the best fitting smooth curve of degree two or three by enough vertical distance to change the applicable fee for timing. This nicety could certainly be looked at in a preliminary study of the best rules for judging the effects of market timing and setting fees accordingly. It is hard to believe that any approximating curve greater than degree three would be of value, but this possibility should not be totally dismissed.

Best Fitting Parabola. As mentioned earlier, neither one of two adjacent best fitting line segments with different slopes may approximate transaction prices near their point of intersection (inflection point). In many cases, there is a family of parabolas (all with vertical axes) that have the same slope as each of the adjacent lines at the unique point where they touch each line. One of the family will be the best fitting parabola for all transaction points between the two points of tangency. We present here the formulas for calculating the family of parabolas and for choosing the best fitting. Using the same notation as previously, let the two adjacent best-fitting lines in the t,r plane be $$r = \lambda_1 t + \mu_1, \text{ and } r = \lambda_2 t + \mu_2 \qquad (13)$$

and the best fitting parabola described by three parameters $r_0$, a, and $t_0$, $$r - r_0 = a(t - t_0)^2. \qquad (14)$$

The requirement that the parabola is tangent to the first line at a point $t_1$ and to the second line at a point $t_2$, where $0 < t_1 < t_0 < t_2$, and intersects the lines at no other points, determines the points $(t_1, r_1)$ and $(t_2, r_2)$ in terms of the known parameters defining the two lines and the parameter a, as follows:

$$t_1 = (\lambda_1 - \lambda_2)/4a + (\mu_1 - \mu_2)/(\lambda_2 - \lambda_1) \qquad (15)$$

$$t_2 = (\lambda_2 - \lambda_1)/4a + (\mu_1 - \mu_2)/(\lambda_2 - \lambda_1) \qquad (16)$$

$$r_1 = \lambda_1 t_1 + \mu_1, \text{ and } r_2 = \lambda_2 t_2 + \mu_2, \qquad (17)$$

where if $\lambda_2 > \lambda_1$, then a>0, and if $\lambda_2 < \lambda_1$, then a<0.

As a check, in the symmetric case, where $\lambda_2 = -\lambda_1$, then $r_1 = r_2$ and $r_0 = r_1 + \lambda^2/4a$. The parabola opens upward if a is positive and downward if a is negative, as it should.

In the general case, the horizontal distance occupied by the parabolic segment $$t_2 - t_1 = (\lambda_2 - \lambda_1)/2a \quad (18)$$

increases monotonically and the parabola becomes progressively flatter as the parameter, a, increases from 0 to plus infinity, opening upward, or minus infinity, opening downward.

The system computer can, once again effectively instantaneously, calculate the vertical separation of the transaction price points in the variable time interval where the parabola is the best fitting segment in the root-mean-square sense we have used in Equation 2, with weightings to correct for transaction size variations as before. It will by this means find the value of "a" which minimizes this RMS separation, and accordingly is the unique best fitting parabola.

Stated differently, what is disclosed is a method for use by buyers and sellers in the execution of trades, each trade defining a respective price. In this method, prices of trades executed within the system are logged and a trend line is derived therefrom. A trading fee for a particular trade is determined, the fee imposed upon the buyer in the event the respective price is below the trend line, the fee imposed upon the seller in the event the respective price is above the trend line. The amount of the fee is functionally related to the difference between the respective price and the trend line. Preferably the fee is in a monotonic increasing relationship with the magnitude of the difference, and is in a monotonically decreasing relationship with the size of the particular trade.

Market Maker Relations

In keeping with the invention, sponsors of a marketplace system may wish to establish contractual relationships with dealers, which establish a large number of them as authorized dealers. To become an authorized dealer for an item, a reliable, adequately capitalized individual or organization with knowledge of how a dealer operation functions and prepared to meet audited account-keeping standards, must agree that:

it will make a good market in that item and endeavor to make the best possible market according to the guidelines of the system on how the excellence of market making is to be measured by the system, based on features (a), (b), and (c) mentioned above. In particular, the authorized dealer, for the most part, must quote spreads that are smaller than those quoted in the same item at the same time by dealers in competitive marketplaces.

it will not buy or sell the item in any manner except through the sponsors' system, including abiding by all the rules of the system, and in particular will promptly, fully, and accurately report every transaction in the item according to system rules.

It should be noted that when an authorized dealer has a transaction with its customer, the customer may not be obligated to report, but the dealer is still obligated to do so. In this way the system and its sponsors, in principle, know the holdings of its dealers as up-to-date as the last trade report.

To compensate authorized dealers for loss of revenue from quoting smaller spreads than those quoted by dealers in the same item in other competitive marketplaces, the system sponsors must establish an adequate compensation arrangement.

Market makers in every market seek some kind of a balance between maximizing their own profits (transaction by transaction) and providing the transaction as a service to the customer at a lower customer cost. The larger the spread the more profit the market maker receives on each trade that is consummated, and at the same time the fewer the quotes accepted by the customer. The market maker who takes too big a piece of the pie gets less business from the customer. If all else stays the same, there is some theoretical balance point at which the market maker maximizes his profit. Since all else does not stay the same, there is a kind of dynamic equilibrium among all dealers around the balance point. The market maker, utilizing his sense of, or feel for, the market and the information provided by his customers, perpetually seeks spreads under varying conditions which maximize his profits. Some market makers from time to time take a different tack and operate with wider spreads, not making so many trades, making more money on each one and not working so hard. This approach works particularly well in the short term and with new customers. A market maker can rest on an already achieved reputation for small spreads for a while and his business may not fall off much. In any marketplace, among market makers seeking the balance point that maximizes their profits, some are further from that point than others. A small stream of dissatisfied customers continually leaves this marketplace, while another stream of hopeful customers, generally with somewhat different total volume, may enter it, bringing with them their trading volume previously carried by other competitive marketplaces. The only thing that can offer market makers an incentive to lower spreads below those which give them the transaction profit they seek is some kind of financial compensation. Two of these were discussed above:

(1) The fortuitous timing fee. The dealer with wide spreads around the trend curve approximating the scatter of transaction prices (as illustrated in FIGS. 1 and 2) more frequently sells higher and buys lower, and therefore is penalized by the fortuitous market timing fee more frequently than the more efficient dealer with narrower spreads who trades closer to the trend curve.

(2) A characteristic of such marketplace systems is that their sponsors, in contrast to older marketplace systems, will generally have and use the full power, speed, and bandwidth of modern computer networks. Their users will have the added efficiency of lower hardware, communication, and network costs. These savings may be passed on to all users including market makers, who thus may have cost advantages over market makers in competitive markets.

Still, it is desired to virtually guarantee that the system will be the most efficient, so more must be done.

System sponsors must use the method that rewards efficient risk-takers who provide market liquidity and eliminate the market maker's traditional method of maximizing revenues from market making itself. The only way they can do that is to somehow measure the performance of their authorized dealers as efficient market makers in a way that is fair, transparent, and acceptable to all users. Quantitatively measuring a market maker's performance cannot be done in a satisfactory way without complete, accurate trade-by-trade transaction reporting. The width of the spread does not measure the efficiency of a dealer without other information. When the risk is higher because of market conditions, a wider spread is justified and should not be penalized. The invention requires the system itself to calculate for each transaction between a customer and an authorized dealer, and for each authorized dealer in the item at the time of the transaction, the (1) unit price difference and (2) the money value difference (size times unit price) between the transaction and (case a) if the transaction is a customer purchase, all higher offers quoted by authorized dealers in the item, just prior to the transaction, or (case b) if the transaction is a customer sale, all lower bids quoted by authorized dealers in the item, just prior to the transaction.

The formulas, (1) and (2), are direct measures of the inefficiency foisted on the marketplace by dealers whose spreads are too wide.

To best utilize this data, authorized dealers should be separated into classes depending on their size. The sponsors should initially separate authorized dealers into Classes, I, II, III, etc., by the minimum amount of liquid capital (available for trading and segregated from all other assets) that the authorized dealer must have. Note that dealers' classifications may vary from item to item. A dealer may be in Class I for one item and class II for another, but most authorized dealers will probably be in the same class for most items. At the end of the first operating quarter or other initial period of operation, when trading volumes of authorized dealers are available in each item, these volumes may also have to meet minimum requirements for a dealer to remain in its class. Class I has the highest requirement for liquid capital and trading volume, Class II has a smaller capital and trading volume requirement, etc. In a very large market like international currency trading, with trade sizes as large as $1 billion or more and as small as $10,000 or less, there might be as many as ten or more classes. Class I might require three or four times the capital and trading volume that Class II required; Class II three or four times as much as Class III, and so on (using the same three or four ratio each time) right down to Class X (ten), requiring about five orders of magnitude smaller required capital and trading volume. The largest, most successful and inevitably most prestigious authorized dealers would be in the lowest category (1) for most if not all the items they deal with. Dealers form vertical "chains" so that if a customer wants a quote (e.g. in a particular class between 1 and 10) so that dealers within a particular chain would refer the order up or down to a dealer capable of handling that size. The goal is that chains will compete with each other, yielding efficiency. Dealers might also normally be prohibited from giving quotes and making trades in size above a certain maximum size, which maximum might be lower, by a factor of three or four, than the quote size maximum for the next lower class. Depending on performance over time, authorized dealers may be reclassified as necessary, and new authorized dealers may be given a grace period in their initial class assignment, and with a requirement initially only on liquid capital, not on volume.

Authorized market-makers in an item are financially motivated to compete against other authorized market-makers in that item, by being evaluated on their performance on each transaction of the item taking place on the system by a system feature: If it is a sale by a non-market-maker user, the central computer(s) keep track of the bids of all the authorized market-makers at the time of the transaction, and if it is a purchase, the computer keeps track of the offers. In both cases the competing market-makers get penalty points depending on how close their bids or offers were to the winning quote. Considering the case of a customer sale, the market-makers who had the same bid as the market-maker who bought the item, are awarded zero penalty points. Those with lower bids get more penalty points depending on how far they were from the transacted bid, with maximum penalty going to a market-maker who had no bid showing at the time of the transaction. In the case of a customer purchase, the market-makers who had the same offer as the one who sold the item, are awarded zero penalty points. Those with higher offers get more penalty points depending on how far they were from the transacted offer, with maximum penalty going to a market-maker who had no offer showing at the time of the transaction. Market-makers must only be expected to compete against other market-makers who are in their same class, where the class is defined by the range of transaction volume, such as the volume ranges illustrated in Table 4. The scale of the penalty points may depend on the volume of the trade. i.e. larger for larger trades, and may be different for different items, i.e. more for easy-to-trade items.

Periodically, perhaps monthly or quarterly, the points that each market-maker received during the period for all the items and all the size classes that that market-maker is by its contract with the system sponsor(s) authorized and required to participate in are aggregated (collected and totaled) by the system computer. Sponsor(s) must then give bonuses to market-makers depending on their point scores. The lowest penalty point scorer receives the largest bonus, the second lowest gets the second largest, etc.

The bonus has to equal in motivational strength the desire for each market-maker to bring in more profits for itself by having wide spreads and must be competitive with marketplaces that do not have this incentive. Most of the market-makers on the system should get substantial bonuses. Very few should get no bonus, perhaps only those who are expected to resign—with resignation procedure conforming to market-makers' agreements with sponsors. When the sponsors' marketplace becomes dominant in the item trading volume with respect to all marketplaces, the natural efficiencies of the largest market will easily provide adequate capital for compensating the best dealers by these or similar formulas. Until then, the amounts the dealers should receive as bonuses may perhaps have to be in part, in the form of notes, stock options, or similar paper.

Without this invention, in any of today's large active markets in bonds, stocks or currencies, there are inefficiencies because of normal dealer acquisitiveness (a.k.a. "greed"), which are hard if not impossible to weed out because there is no way, other than by use of this invention, to measure dealer efficiency fairly, promptly, and inexpensively. If wise choices are made by the sponsors for bonus amounts, properly administered, the Plan, then will inevitably give the sponsors' system the largest market share among marketplaces competing item by item.

In the trend that began in the last few years where market-makers are being dis-intermediated in many financial marketplaces, any sponsor of a market-place system should consider operating without market-makers or with a minimal number of market-makers. This can be done by sponsor(s) or their agents reviewing the situation in each item and each size class, item by item, size class by size class, and making decisions to eliminate market-makers where customer order flow makes it possible to operate without market-makers, or to reduce their number to a very few with little competition, right down to a single trusted market-maker without competitors. In the case of a marketplace system linking central banks, it will probably be necessary to have only one market-maker in each currency that is an item of the marketplace system, say currency Y in exchange with the central bank's own currency X, if the central bank of Y is also a sponsor of a system. In that case each central bank X and Y should have a market-maker, and the two negotiate the X/Y exchange ratio, more or less continuously.

Crisis Fees

In a marketplace system for national central banks linking one or more central banks to each other and/or to customers, including financial institutions and organizations, corporations, government agencies, brokers, exchanges, dealers, individuals, and others who desire to sell/buy currencies, options, futures and other financial instruments denominated in the central banks' currencies, the sponsor(s) will generally be one or more central banks who along with the customers will be users of the system. Such central bank systems will benefit from the timing fees and market maker evaluation methods described above, but further benefit from the imposition of so-called "crisis fees."

Central banks may have to withstand a run on their own currencies of the nature of a speculative bear market raid, where the central bank or national authorities feel forced to sell their currencies at dropping prices or buy them again at higher prices, in order to protect their national financial systems. Either way at the end of the crisis the country can wind up with its currency greatly devalued as many recent examples illustrate. Crisis fees are charged only to users selling a falling currency (and thus buying a rising currency). The crisis is benchmarked by the price of other currencies not under attack rising with respect to the falling currency of the central bank. A crisis is often marked by rapid increases in (1) transaction volume and (2) price. These effects are measured by formulas for (1) gross volume of transactions in a time segment (not generally having the same duration as the time segments for calculating fortuitous market timing fees) and (2) the slope of the best-fitting straight line in a time segment, calculated with the volume of each transaction linearly proportional to, i.e., equal, to its weighting (unlike Table 2, where the weighting rises roughly logarithmically as the volume increases). The magnitudes of these two criteria when each exceeds an established threshold, are measures of the current severity of the crisis, and the time integrals (in the mathematical sense of integral calculus) of these magnitudes are measures of the total severity of the crisis from the beginning (when the magnitudes first exceeded the established thresholds) to the current time. Formulas and algorithms for the calculation of these magnitudes, their threshold values, and their time integrals are included in the software by which the system is controlled. Because of the importance of the immediate moment and the crossing of threshold values, time segments begin with each new threshold value and end at every trade. Unlike the time segments of the fortuitous market timing fee, there are then numerous overlapping time segments under evaluation. Users should be informed of the size of the current crisis fee applicable to a transaction before a user executes the transaction. Indeed preferably everyone on the system would be informed on a continuous basis of the size of the current crisis fee. This is entirely different from the market timing fee which should only be considered beneficial to the user if it is noticed at all.

With respect to bear raids for which we have historical data, although there may be long precursors indicating a weakening of the currency that ultimately comes under attack, the raid itself largely takes place in a short time interval. There is no guarantee that this will always be the case. Indeed the very existence of crisis fees may slow down an ensuing raid so that a crisis is protracted enough so that it does not seem to be taking place. A "slow" raid in fact is far less devastating historically than rapid raids because the extra time can be used to protect the falling currency by conventional means, such as arranging lines of credit or collateralized loans. Primarily because of this "slow" raid possibility, we believe it would be unnecessarily risky to rely on a fixed computer algorithm to determine the moments for introducing or for changing crisis fees. Instead the system computers will give the system managers various presentations of data in the most meaningful and immediately useful form for helping them, together with the sponsor(s), judge the severity of the situation. This data will include among other things, in time segments as described above: (1) when threshold values have been exceeded and by how much, (2) upside and downside incremental size and (3) and upside momentum. Parameters are then available to the sponsors to be selected under the conditions prevailing at crisis time so that system managers who have become very familiar with this type of data by extensive training, planning, and rehearsing, are in a well informed position and fully understand how to determine and adjust crisis fee levels to protect a central bank by significantly reducing the frequency, speed and magnitude of such devaluations.

If the teachings detailed above have been properly followed, then until the onset of a crisis, central bank X will have close to 100% market share of all currencies it exchanges for its X currency with one exception. Market share of currency exchanges of another central bank, say Y, that participates in a multi-central bank system with X, must be split between X and Y, on an agreed basis, say 50—50. Together they would still have nearly 100% market share. For this reason, it will be very difficult for any speculators or other major players in currency X to begin a bear raid. At the critical time when a raid might otherwise have begun, there will be no other marketplaces where there are X buyers or sellers of significant size poised to launch a raid.

Assuming the system controls the market for currency X, crisis fee rates can be, hypothetically, set so high that the system would virtually halt all trading in X. At the other extreme, crisis fees can be set at zero so that they have no effect on trading. Somewhere between the two is a broad range of parameter choices where the system will work well to bring in crisis revenues for the benefit of the central bank and the nation and also at the same time moderate the crisis. Fees should be set so that the price of stable currencies Y do rise with respect to X, but the increase is slower and the price swing significantly less than it would have been without the crisis fee. Crisis fees need never stop trading altogether to accomplish this result.

As described herein, the sponsors of any system utilizing this invention seem required to make choices. If they intend to favor or discourage transactions depending on transaction purposes, they should define the purposes by categories and make choices of the degree to which they are to be favored or discouraged, such as illustrated in Table 5. If they intend to derive revenue from fee charges for market timing, they must arrange to set various parameter values that determine these fees and in particular for stabilizing markets in a way that also increases fees. It is anticipated that sponsors will determine such purposes and parameters in broad outline, and then authorize managers to make the day-to-day choices of parameter values within guidelines that the authorizations set forth.

Managers with hands-on day-to-day experience over time will become very adept at setting parameter values that make the market run smoothly and produce substantial revenue in the process. Any and all parameter values will be embedded in software and will be readily adjustable within seconds by experienced and authorized managers.

Extension of systems from a first country to additional countries. Many central banks are in a position to initiate a system in which they, as the lead country, either entirely on their own or accompanied by some trading partner central banks, (usually "few" trading partner central banks, but if the lead central bank has a dominant currency, it could be "many" trading partner central banks) can fully justify sponsoring a state-of-the-art intranet foreign exchange marketplace system. Such a system starts with the lead country knowing that it can initially control the price variability of its currency, because the country has an existing controlled, non-convertible currency, or, in connection with sponsoring a system, it takes the initiative and issues a new "international" currency, or because, with its participating trading partners it is assured that the initial foreign exchange rate pairs will be stable. Countries which might consider joining the system operated by the lead country may have strong incentive to do so based on evidence offered by the lead country that its trade with the lead country and other countries expected to join the lead country's system will increase substantially and profitably thereby.

Then proper use of an appropriate combination (or all) of the techniques discussed above will make sure that over the years the lead country's system retains that control, as it becomes an increasingly important player on the international scene, even ultimately with a dominant international currency, and as the amount of its currency held by foreigners grows rapidly, while its own currency reserve grows much more slowly. Throughout this process the sponsor or sponsors' system always remains pre-eminent with close to 100% market share. No other marketplace can compete with it if it uses the above-mentioned methods wisely.

As the stability and growth potential of its currency becomes clearer, new countries will wish to participate in its system. The country of the lead central bank can offer these newcomers a partnership with network nodes in their country's financial capital and other major cities, carrying the new partner country's trading data on the lead country's system network, and integrating the new data into its various transaction and quotation displays and reports. If it wishes to be completely egalitarian, the lead central bank can agree to share system fees equitably with each participating country central bank and to accept the voice of the partner country central bank as equal in weight to its own in setting system operating parameters and other sponsor policies. Even if it goes to this egalitarian extreme, which of course it need not do, it retains the advantage that it defined the initial system to meet its own needs and preferences.

Let $X_{cbn}$ be the reserves of the lead central bank at various times, generally years apart and indexed as n=0, 1, 2, . . . , where $t_0$ (n is 0) is at the start of the system, and the larger n, the greater the time elapsed since the start of the system (i.e., $t_{n+1} > t_n$, for all n). Let $X_{fn}$ be the amount of the currency of the lead central bank in the hands of foreigners at the same times n=0, 1, 2, . . . Then at n=0, $X_{fn}$=0 or is relatively small. If the lead central bank's sponsor operates in the manner described above, then at some point in time, say when n=N, much more of its currency is in the hands of foreigners than it carries as reserves. This is the optimum desirable and stable situation. For when this is the case, the lead country's national treasury has relatively little non-working funds (not invested in equity or interest bearing loans or bonds), while the rest of the world has fully accepted its currency. Its seigniorage increases the value of its currency by perhaps 30%. This situation prevails only for mature, stable currencies. Realistically this maturity develops only over a period of years, where a sequence of the following relationships occur: $X_{Cb0}$ is relatively small, First, $X_{f0}=0$; $0 < X_{cb1} \approx X_{f1}$;
Next, $X_{cb1} < X_{cb2} < X_{f2}$;
Then, $X_{cb2} < X_{cb3} << X_{f3}$;
and finally $X_{cb3} < X_{cb4} <<< X_{f4}$; with N=4.

$X_{cbN}$ has grown little compared to $X_{cb0}$, but $X_{f2}$ has grown enormously compared to $X_{f0}$, perhaps a thousand time more.

The foregoing discusses preferred embodiments for the invention, but the invention is not limited by the particular embodiments described above. Those skilled in the art will have no difficulty devising myriad obvious variants and improvements of the invention, all of which are intended to fall within the scope of the claims which follow.

We claim:

1. A trading system for use by buyers and sellers in the execution of trades, each trade defining a respective price, the system comprising:
   apparatus logging prices of trades executed within the system;
   apparatus deriving a trend line from said logged prices;
   apparatus determining a trading fee for a particular trade, said fee imposed upon the buyer in the event the respective price is below the trend line, said fee imposed upon the seller in the event the respective price is below the trend line; the amount of said fee functionally related to the difference between the respective price and the trend line.

2. The system of claim 1 wherein the function further defines the fee in a monotonically increasing relationship with the size of the particular trade, almost independent of size.

3. The system of claim 1 wherein the function further defines the fee to include a fixed amount.

4. The system of claim 1 wherein the derivation of the trend line is weighted with the sizes of the trades.

5. The system of claim 1 wherein the derivation of a trend line is with respect to a time segment that completely covers a trading day.

6. The system of claim 1 wherein the derivation of a trend line is with respect to a time segment within which a preselected amount of trading has occurred.

7. The system of claim 1 wherein the derivation of a trend line is with respect to a time segment within which a preselected amount of trading has occurred, or within which a preselected interval of time has passed, or the boundary between adjacent segments is adjusted for improving line-fit, or some combination of these three.

8. The system of claim 1 wherein the function defines the fee in a monotonic increasing relationship with the magnitude of said difference.

9. The system of claim 8 wherein the monotonic increasing relationship with the magnitude of said difference is capped at some predetermined magnitude.

10. A method for use by buyers and sellers in the execution of trades, each trade defining a respective price, the method comprising:
    logging prices of trades executed within the system;
    deriving a trend line from said logged prices;
    determining a trading fee for a particular trade, said fee imposed upon the buyer in the event the respective price is below the trend line, said fee imposed upon the seller in the event the respective price is above the trend line; the amount of said fee functionally related to the difference between the respective price and the trend line.

11. The method of claim 10 wherein the function further defines the fee in a monotonically increasing relationship with the size of the particular trade, almost independent of size.

12. The method of claim 10 wherein the function further defines the fee to include a fixed amount.

13. The method of claim 10 wherein the derivation of the trend line is weighted with the sizes of the trades.

14. The method of claim 10 wherein the derivation of a trend line is with respect to a time segment that completely covers a trading day.

15. The method of claim 10 wherein the derivation of a trend line is with respect to a time segment within which a preselected amount of trading has occurred.

16. The method of claim 10 wherein the derivation of a trend line is with respect to a time segment within which a preselected amount of trading has occurred, or within which a preselected interval of time has passed, whichever occurs first.

17. The method of claim 10 wherein the function defines the fee in a monotonic increasing relationship with the magnitude of said difference.

18. The method of claim 11 wherein the monotonic increasing relationship with the magnitude of said difference is capped at some predetermined magnitude.

19. A method of evaluating a market maker in a trading system in which trades take place, the market maker posting offered bid/ask prices for trades from time to time, the market maker having an associated trading volume, the method comprising:

logging prices of trades executed within the system;

for each particular trade having an actual price and for which the market maker is contemporaneously offering a bid/ask price, noting the respective difference between the price offered by the market maker for the trade and the actual price;

summing the magnitudes of the respective differences yielding a sum; and imposing a penalty upon the market maker as a function of the summed magnitudes.

20. The method of claim 19, further characterized in that for each particular trade for which the market maker is not offering a price contemporaneously with a particular trade having its actual price, adding to the sum an amount bearing predetermined relation to the particular trade.

21. The method of claim 20 in which the predetermined relation is a predetermined fraction of a unit price for the particular trade.

22. A method for trading of rising and falling currencies, said trading performed with respect to trades made by traders, the method practiced with respect to a particular currency, the method comprising the steps of:

logging the gross value of transactions for the particular currency in a time segment;

deriving a trend slope for transactions for the particular currency in a time segment; and at times when the gross value of transactions for the particular currency exceeds a first predetermined limit and the trend slope for the particular currency is negative and exceeds a second negative limit, imposing a fee upon traders who are selling the particular currency and thus are buying a currency that is not the particular currency.

23. A first method for operation of a currency trading system with respect to a first currency of a first country, said first method comprising the steps of:

establishing the currency trading system within the first country, said system employing a second method for use by buyers and sellers in the execution of trades, each trade defining a respective price, the second method comprising: logging prices of trades executed within the system; deriving a trend line from said logged prices; determining a trading fee for a particular trade, said fee imposed upon the buyer in the event the respective price is below the trend line, said fee imposed upon the seller in the event the respective price is above the trend line; the amount of said fee functionally related to the difference between the respective price and the trend line;

establishing within a second country a trading node of the currency trading system; and sharing with the second country the trading fee.

24. The first method of claim 23 further characterized in that the trading system employs a third method, said third method evaluating a market maker in a trading system in which trades take place, the market maker posting offered prices for trades from time to time, the market maker having an associated trading volume, the third method comprising:

logging prices of trades executed within the system;

deriving a trend line from said logged prices;

for each particular trade having an actual price and for which the market maker is contemporaneously offering a price, noting the respective difference between the price offered by the market maker for the trade and the actual price; and summing the magnitudes of the respective differences yielding a sum.

25. The first method of claim 23 further characterized in that the trading system employs a fourth method, said fourth method performed with respect to trading of rising and falling currencies, said trading performed with respect to trades made by traders, the fourth method practiced with respect to a particular currency, the fourth method comprising the steps of:

logging the gross value of transactions for the particular currency in a time segment;

deriving a trend slope for transactions for the particular currency in a time segment; and at times when the gross value of transactions for the particular currency exceeds a first predetermined limit and the trend slope for the particular currency is negative and exceeds a second negative limit, imposing a fee upon traders who are selling the particular currency and thus are buying a currency that is not the particular currency.

26. A method of evaluating market makers in a trading system in which trades take place, the market makers posting offered prices for trades from time to time, the market makers having an associated trading volume, the method comprising:

logging prices of trades executed within the system;

for each particular trade having an actual price and for which the market makers are contemporaneously offering prices, noting the rankings of the market makers according to each respective difference between the price offered by respective ones of the market makers for the trade and the actual price; and aggregating the rankings.

27. A method of evaluating market makers in a trading system in which trades take place, the market makers posting offered prices for trades from time to time, the market makers having an associated trading volume, the method comprising:

logging prices of trades executed within the system;

for each particular trade having an actual price and for which the market makers are contemporaneously offering prices, noting the positions of the market makers according to each respective difference between the price offered by respective ones of the market makers for the trade and the actual price; and assigning penalties to respective market makers as a function of the positions of the respective market makers.

\* \* \* \* \*